(12) United States Patent
Tarnok

(10) Patent No.: US 9,080,872 B2
(45) Date of Patent: Jul. 14, 2015

(54) GPS TUNER

(75) Inventor: Gabor Tarnok, Budapest (HU)

(73) Assignee: GPS TUNER KIT, Budapest (HU)

( * ) Notice: Subject to any disclaimer, the term of this patent is extended or adjusted under 35 U.S.C. 154(b) by 584 days.

(21) Appl. No.: 12/799,295

(22) Filed: Apr. 20, 2010

(65) Prior Publication Data

US 2013/0096819 A1    Apr. 18, 2013

Related U.S. Application Data

(60) Provisional application No. 61/214,315, filed on Apr. 22, 2009.

(51) Int. Cl.
| | |
|---|---|
| *G06F 19/00* | (2011.01) |
| *G01C 21/00* | (2006.01) |
| *G01C 21/20* | (2006.01) |
| *G01C 21/36* | (2006.01) |

(52) U.S. Cl.
CPC ............... *G01C 21/00* (2013.01); *G01C 21/20* (2013.01); *G01C 21/3664* (2013.01)

(58) Field of Classification Search
CPC .... G01C 21/00; G01C 21/20; G01C 21/3664; H04W 4/0046; H04W 4/00; H04W 4/001
USPC ............ 701/428, 467, 538; 348/488; 422/418
See application file for complete search history.

(56) References Cited

U.S. PATENT DOCUMENTS

| 7,737,965 B2* | 6/2010 | Alter et al. ..................... 345/419 |
| 2005/0017961 A1* | 1/2005 | Sakata et al. .................. 345/204 |
| 2009/0033552 A1* | 2/2009 | Kirmuss et al. ........... 342/357.08 |
| 2011/0216064 A1* | 9/2011 | Dahl et al. ..................... 345/428 |

* cited by examiner

*Primary Examiner* — McDieunel Marc

(74) *Attorney, Agent, or Firm* — Handal & Morofsky LLC

(57) ABSTRACT

A GPS tuner provides high precision measurement, mapping, and Geocaching tools for a pocket PC and other mobile computing devices. The tuner accepts waypoints defining a desired route for navigation by a user, including land, water, and air routes. Waypoints comprise latitude, longitude, and altitude of a geographical coordinate; user-assigned names; a type of geographic coordinate and coordinate description; photos; and associated sounds. Waypoints are inputted by a user keying in way point data; by copying waypoints from another stored route; internet downloading from a Geocaching file; or importing from a GPX file. Waypoints are also established from a free-form hand-drawn route on a touch screen, which display a world-wide digital elevation model, and upon which a user scanned map is overlaid through a calibration process. Navigation functions are selectable from a touch screen display of a self-adapting, ergonomically configured, array of icons.

9 Claims, 30 Drawing Sheets

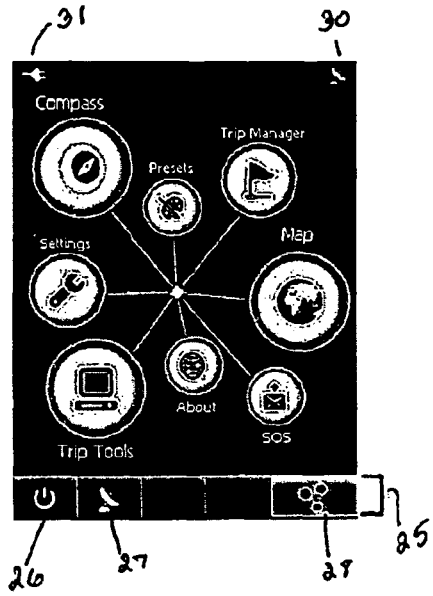
FIG. 2A
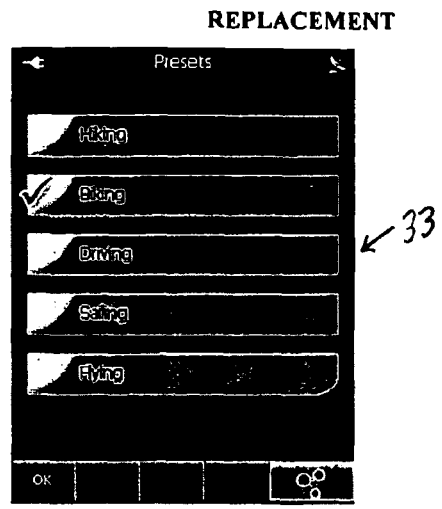
FIG. 3
Options
 Closes the Main Menu and opens the screen that was last open before the Main Menu.
 Stops navigation and exits the application.
 Opens the GPS Settings screen.
FIG. 47
(Main Menu Icon Options)

45 FIG. 5 47
(North America "Base Map" Data)
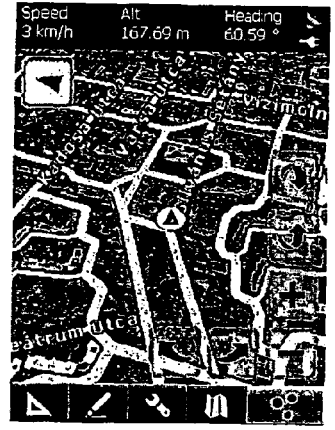
FIG. 6
(Street Level Data Map)
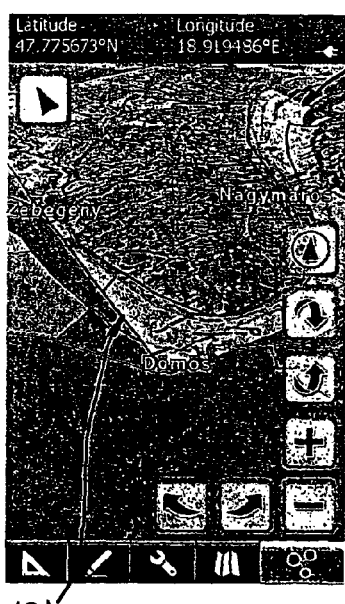
42A FIG. 7
(Calibration Completed
for Custom Map Usage)
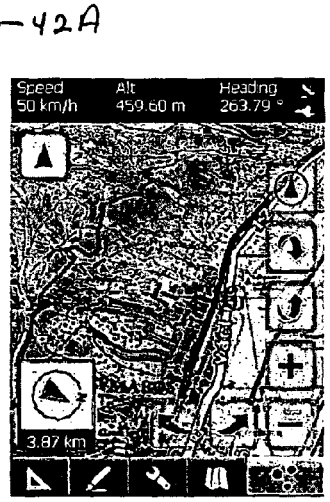
FIG. 8
(3D Hybrid Map View-With
Multiple Content Layers)
48 FIG. 9
("Draw Your Route" Function)

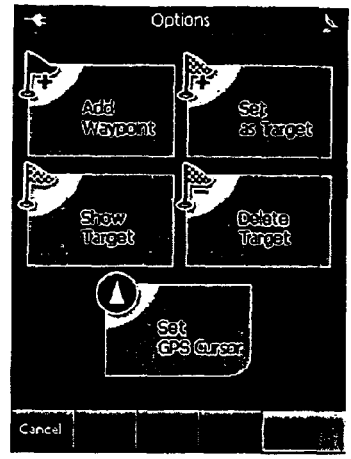

FIG. 10    FIG. 11

Basic Operations

| Add Waypoint | You can save the selected map location as a new waypoint. |
|---|---|
| Set as Target | You can select this map position as your target. If you have activated the menu over a waypoint, the waypoint itself becomes the selected target. |
| Set GPS Cursor | If your GPS is not active, you can relocate the GPS cursor to this map position. When GPS position is fixed, the cursor jumps to your current location automatically. |

Further Options If a Target is Selected

| Show Target | It displays the map with the target in the center of the screen. |
|---|---|
| Delete Target | You can delete the target by tapping this button. |

FIG. 49

(Summary of Options for Map Point Selection using a Stylus)

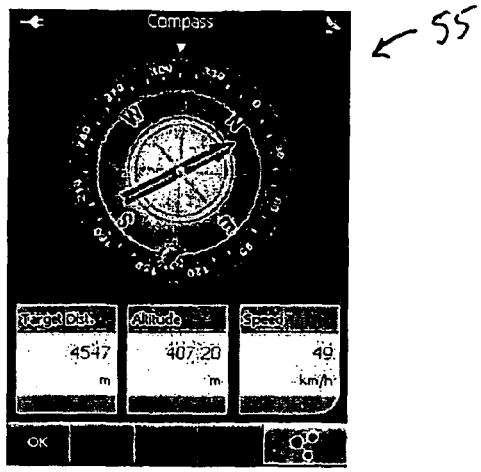

FIG. 12

Setting a Target:

Tap and hold a point on the map and select the Set as target option from the appearing menu.

or

Click on the Target button after you have selected a waypoint from Trip Manager.

If you set a route point to be a target point, and you come close to it, GPS Tuner will automatically select the next route point in order to help you pass along your route continuously. In addition, a NavBox on the Compass screen appears indicating the distance to the next route point and the direction in which you must turn reaching that point. Before reaching it (at a distance depending on your speed), a human voice also tells you which way to turn.

FIG. 50

(Summary of Options for Setting a Target for the Virtual Compass)

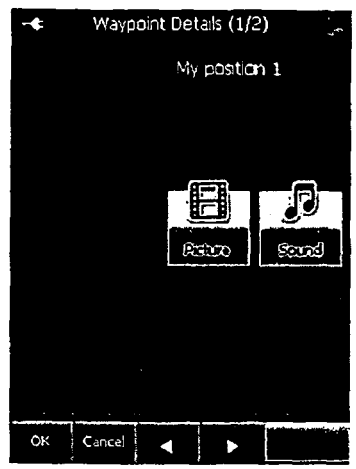

FIG. 13

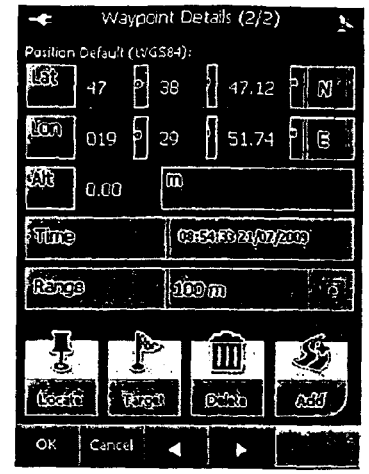

FIG. 14

| Options | |
|---|---|
| Details | Tap this button to see all information, photo and sound saved with this point. |
| Locate | Opens the Map screen with the waypoint displayed in the middle. |
| Target | The selected waypoint becomes your target. |
| Delete | Deletes the selected waypoint from the list. |
| Add New | Saves your current position as a new waypoint. If you wish to save a location other than the current position, modify the latitude/longitude information on the second page of the waypoint details. |
| Add | Tap this button to make the selected waypoint a new route point. |

FIG. 51

(Summary of Functionality for a "Waypoint Details" Screen)

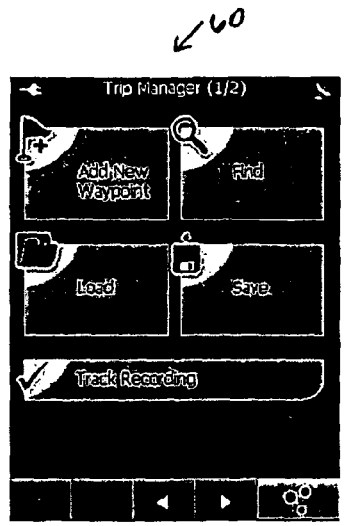
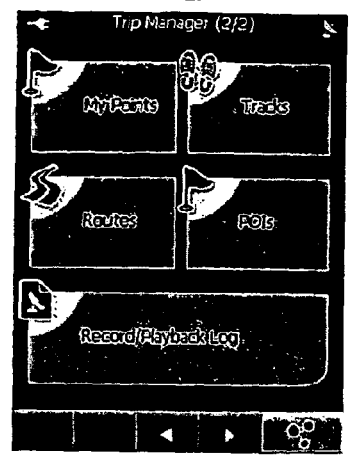

FIG. 15    FIG. 16

Options

| Add New Waypoint | Tap this button to create a waypoint settings its details manually. |
| --- | --- |
| Find | Opens the search screen to find a waypoint, a POI, a route point, a Map POI, a street, or an area |
| Load | You can open a GPX or KML file with POI, track log and route data. |
| Save | You can save your waypoints, track logs and routes to a GPX for KML ile. |
| Track Recording | You can turn track log recording on or off at any time. |
| My Points | Tap this button to open the list of waypoints. Manage your waypoints: display them on the map, set them as target, etc. |
| Tracks | Tap this button to open the list of track logs. Manage your track logs: display them on the map, see their details, make a backtrack, etc. |
| Routes | Tap this button to open the list of saved routes. Manage your routes: display them on the map, reorder the list, make a backtrack, etc. |
| POIs | Tap this button to open the list of POIs. Manage the POIs: display them on the map, see their details, set them as target, etc. |
| Record/Playback Log | You can record new NMEA logs or playback saved NMEA logs here. Set the speed of the playback or jump to any position in the track log. |

FIG. 52

(Summary of Options for the "Trip Manager" Screens 1 & 2)

Track Options:

| Details | Tap this button to see the track segments of this track. |
| Locate | Opens the Map screen with the track displayed in the middle. |
| Target | The selected track becomes your target. |
| Delete | Deletes the selected track from the list. |

(Summary of Options for the "Track" Screen)

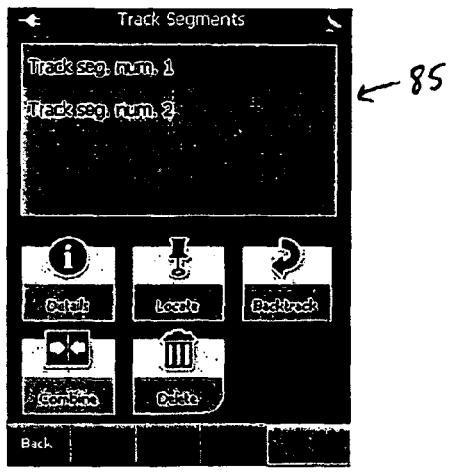

FIG. 20

Track Segment Options:

| Details | Tap this button to see the track points of this track segment. |
|---|---|
| Locate | Opens the Map screen with the track segment displayed in the middle. |
| Backtrack | Reverses the order of track points in the track segment and creates a route... |
| Combine | Combines the selected track segment with the one below it into a single track segment |
| Delete | Deletes the selected track segment from the list. |

FIG. 55

(Summary of Options for the "Track Segments" Screen)

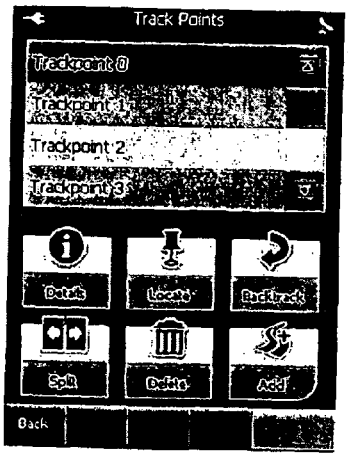

FIG. 21

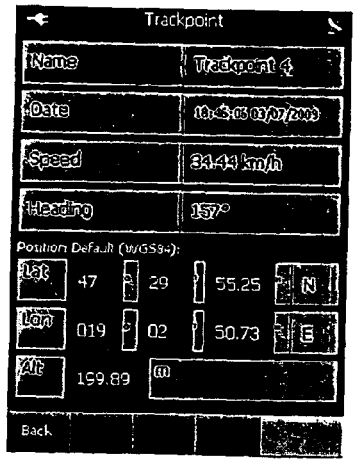

FIG. 22

(Trackpoint 4 Details)

Track Points Options:

| | |
|---|---|
| Details | Tap this button to see the detailed data of the selected track point. |
| Locate | Opens the Map screen with the selected track point displayed in the middle. |
| Backtrack | Reverses the order of track points in the track segment and creates a route. |
| Split | Splits the track segment into two segments at the selected track point. |
| Delete | Deletes the selected track point from the list. |
| Add | Creates a new route point from the selected track point. |

FIG. 56

(Summary of Options for the "Track Points" Screen)

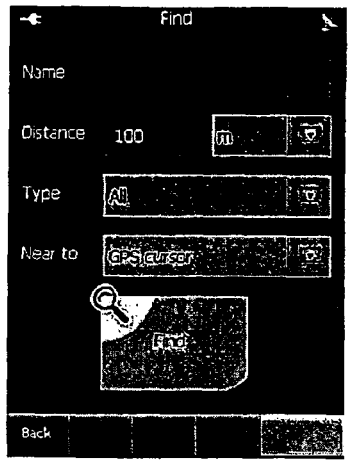

FIG. 23

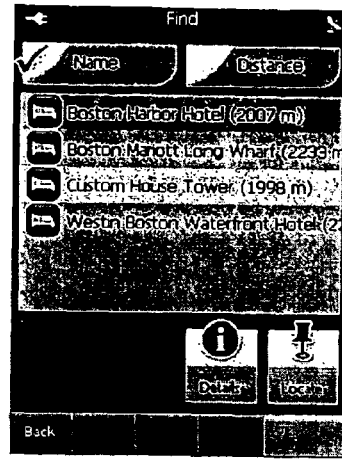

FIG. 24

Find Options:

| Name | Tap this button to type in the name of the object you are looking for. |
|---|---|
| Distance | Select the radius of the search. The radius is limited to 12.5 km (7.77 miles) or 100 km (62 miles) depending on which Find Screen you are on. |
| Type | Select the type of object you are looking for. Options to select from depend on the Find Screen you are on. |
| Near to | Choose whether the search should occur around the GPS Cursor or the Map Center. |
| Find | Start search. |

Find List Options

| Name/Distance | Choose whether you want to sort search hits in alphabetical order or based on distance. |
|---|---|
| Details | Tap this button to see the detailed information on the selected object |
| Locate | Opens the Map screen with the selected object displayed in the middle. |

FIG. 57

(Summary of Options for the "Find" Screen)

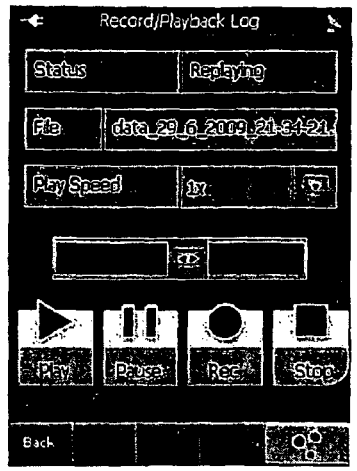
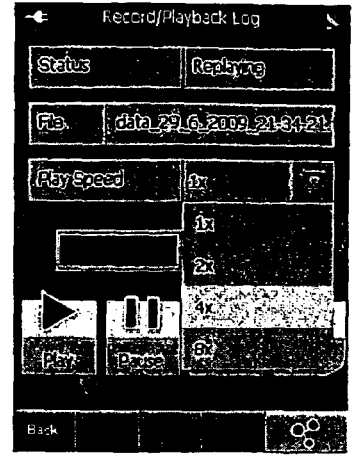

FIG. 25          FIG. 26

Saving NMEA data:

1.) Press the Record button and set the location and name of the NMEA file you want to save.

2.) Press the 'OK' button.

3.) GPS Tuner starts recording the NMEA sentences automatically.

4.) You can stop the recording by pressing either the Stop or the Play button, or pause it by the Pause button.

Replaying NMEA data:

1.) Press the Play button and open an NMEA file.

2.) You can set the replay speed (1X—8X, with 1X being the real-time speed)

3.) You can jump to any position in the NMEA file (skipping unnecessary data) with the help of the trackbar.

4.) You can stop the replay by pressing either the Stop or the Record button, or pause it by the Pause button.

FIG. 58

(Summary of Options for the "Record/Playback Log" Screen)

(Summary of Function Buttons for the "Trip Computer" Screen)

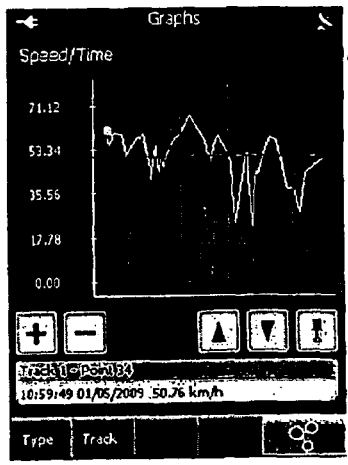

FIG. 29

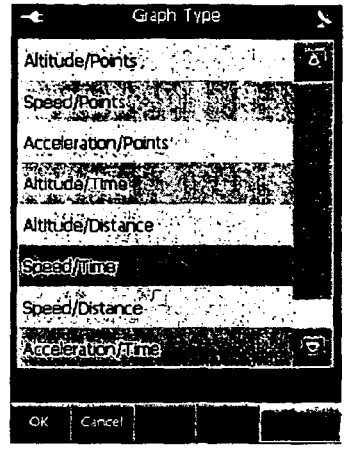

FIG. 30

Graph Options:

|  | Zooms in and out in the graph around the selected point. |
| --- | --- |
|  | Switches between track graphs. |
|  | Opens the Map screen with the trackpoint displayed in the middle. |
| Type | You can select the type of graph drawn on the graph screen. |
| Track | You can select the tracks you want to be drawn on the graph screen. |

FIG. 60

(Summary of Options and Function Buttons for the "Graphs" Screen)

Activating/deactivating speed limit:

Deactivating     Tap the active (vivid) speed limit circle.

Setting a new speed limit value:

1) Tap & hold one of the four speed limit circles.
2) Select a new speed limit value from the list.

(Summary of Options for the "Trip Tools" Speedometer Screen)

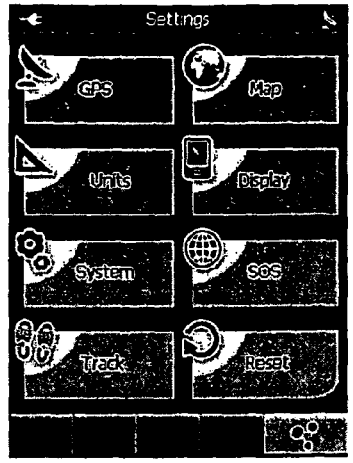

FIG. 33

Options

GPS — You can define the communication port and speed that connects the GPS receiver to GPS Tuner. You can also correct the altitude information and define the method of distance measuring (2D, 3D or Auto).

Map — You can modify the appearance of the map as well as the map layers displayed. Tap the arrows at the bottom of the screen to see all settings.

Units — Change the default measurement units to fit your needs, or tap one of the arrows below to change the coordinate display format and choose one of the various different international and national grids.

Display — Alternative skins and daytime/night colors can be selected. In the current version of GPS Tuner Atlas only the default skin and daytime is activated.

System — Fine-tune some uncategorized settings like recovery functions or the sounds of the application.

SOS — In an emergency situation, use GPS Tuner Atlas to send out an SOS message for you. Here you can set the phone number to send the message to.

Track — With GPS Tuner Atlas you can record your trips to intelligent track logs. Here you can define how track logs are saved when GPS position is available.

Reset — Tap this button and confirm your action, and all settings return to their factory state. Points, routes and tracks you have saved are not affected. Changes take effect only after GPS Tuner Atlas is restarted.

FIG. 62

(Summary of Functions of the "Settings" Screen)

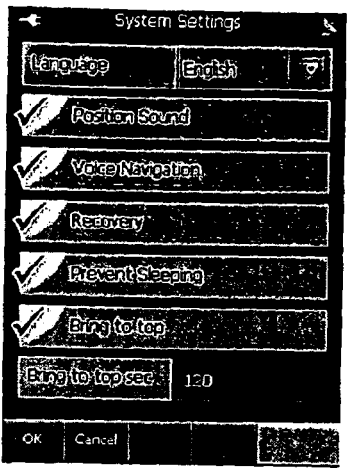

FIG. 34

```
Options

┌──────────────────────────────────────────────────────────────────────────┐
│ Language              Change the language of the user interface          │
│                                                                          │
│ Position Sound        Turn on or off the position sound. When turned on, a beep is played
│                       each time the software receives a GPS position (usually once every
│                       second). This way you can quickly notice when GPS position is lost.
│                                                                          │
│ Voice Navigation      Turn on or off voice instructions for navigation. Voice navigation warns
│                       you before turns when you are navigating a route.
│                                                                          │
│ Recovery              If this option is enabled, GPS Tuner creates backup files for track log
│                       recording in case of an unwanted system halt.
│                                                                          │
│ Prevent Sleeping      If this option is enabled, the PDA will not go to standby even if you do
│                       not tap the screen or push any of the hardware buttons for a while.
│                                                                          │
│ Bring to Top, Bring to Top Sec   If this option is enabled, GPS Tuner Atlas brings itself on top of the
│                       PDA's screen if another application runs on the screen in parallel. Bring
│                       to Top Sec defines the time period after which Bring to Top occurs.
└──────────────────────────────────────────────────────────────────────────┘
```

FIG. 63

(Summary of Options for the "System Settings" Screen)

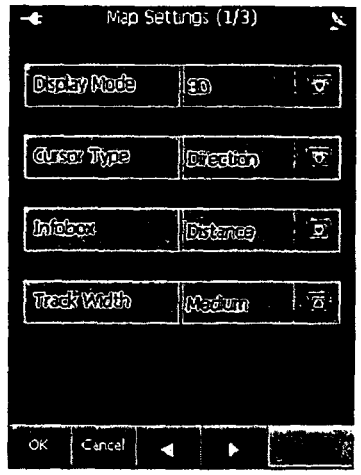

FIG. 35

(Access: Wrench Icon in Map Screen; OR
Main Menu/Settings/Map)

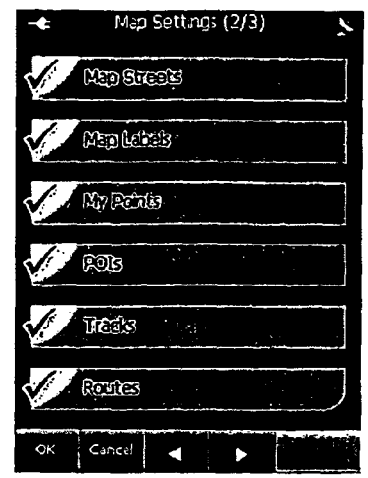

FIG. 36

Settings

| | |
|---|---|
| Display Mode | The map can be displayed in classical top-down (2D) view or in perspective (3D) view. Tilt buttons on the Map screen are available only in 3D mode. |
| Cursor Type | Choose your cursor type as an arrow that also shows your heading (Direction) or a crosshair type position indicator (Cross). |
| Infobox | Select the content of the Info box at the top of the Map screen. |
| Track Width | The thickness of the displayed track logs can be fine-tuned for optimal visibility of the track and the other details of the map. |
| Map Layers | On Map Settings 2/3 page you can define which objects are displayed on the map: Map Streets, Map Labels, My Points, POIs, Tracks and Routes. |
| Map POIs | On Map Settings 3/3 page you can defince which Map POIs are displayed on the map: Food (e.g. restaurants and cafes), Attractions (e.g. museums), Services (e.g. gas stations), Emergency (e.g. hospitals), and Geographical objects (e.g. geocahce). |

FIG. 64

(Summary of the Map Setting Functionality)

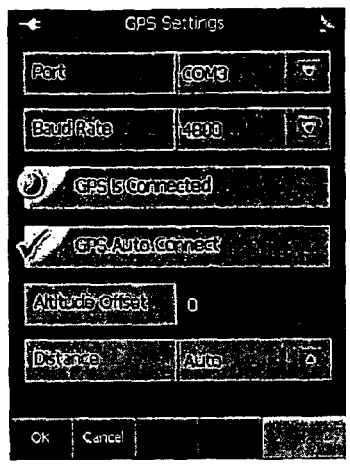 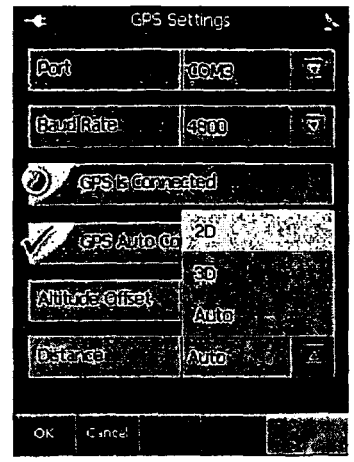
FIG. 37        FIG. 38
FIG. 65
(Summary of Functionality of the "GPS Settings" Screen)

FIG. 39

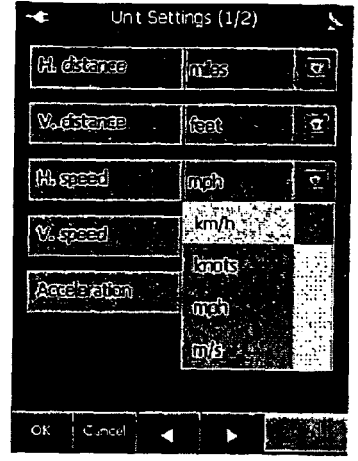

FIG. 40

Options

| H. distance | You can change the units in which horizontal distance (e.g. length of route) is displayed. |
| V. distance | You can change the units in which vertical distance (e.g. elevation) is displayed. |
| H. speed | You can change the units in which horizontal speed is displayed. |
| V. speed | You can change the units in which vertical speed is displayed. |
| Acceleration | You can change the units in which acceleration is displayed. |

FIG. 66

(Summary of Options for the "Unit Settings" Screen)

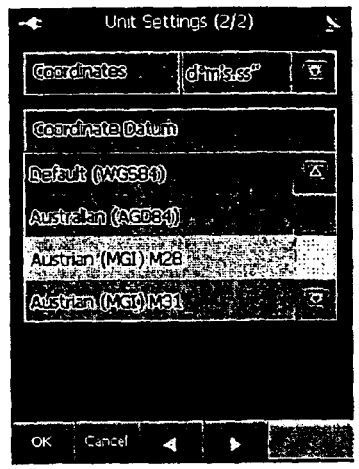

FIG. 41

| National Grids | | |
|---|---|---|
| Default (WGS84) | Finnish (KKJ) Z3 | Italian (ROME40) Z2 |
| Australian (AGD84) | Finnish (KKJ) Z4 | New Zealand (GD49) |
| Austrian (MGI) M28 | German (DH) Z1 | Norwegian (NGO48) |
| Austrian (MGI) M31 | German GK2 | Swedish (RT90) 0gon |
| Austrian (MGI) M34 | German GK3 | Swedish (RT90) 2.5gon0 |
| British (OSGB36) | German GK4 | Swedish (RT90) 2.5gonV |
| Dutch (AMERSFRT) | German GK5 | Swedish (RT90) 5gon0 |
| Egyptian (EGY1907BB) | Greek (GGRS87) | Swedish (RT90) 5gonV |
| European (ETRS89) | Hungarian (EOV) | Swedish (RT90) 7.5gonV |
| European (ED1950) | Indian (Bangladesh) | Swiss (CH1903) LV03 |
| Finnish (KKJ) Z1 | Irish (IRLND65) | USA (NAD27) |
| Finnish (KKJ) Z2 | Italian (ROME40) Z1 | USA (NAD83) |

FIG. 67

(List of implemented National Map Grids - available under "Unit Settings" Screen)

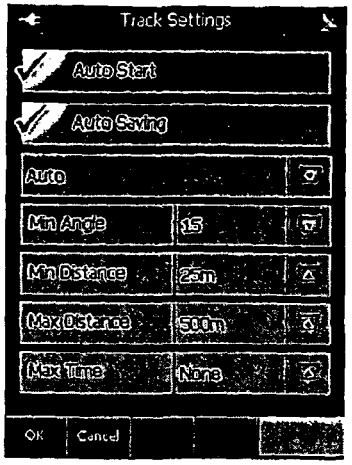
FIG. 42
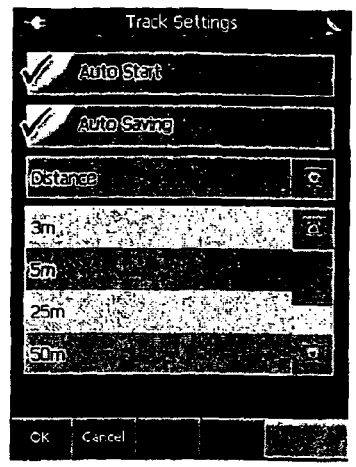
FIG. 43
FIG. 68
(Summary of Options for the Track Log under "Track Settings" Screen)

Options

| | |
|---|---|
| Compass | A sophisticated digital compass with data fields, sun direction indicator, arrow pointing to your selected target, and route navigation box. |
| Presets | You can quickly select setting presets for different activities like biking or sailing. Presets affect the content of the following screens: Trip Computer, Compass, Speedometer and the measurement units used |
| Trip Manager | This powerful Trip Manager helps you manage your points, routes and track logs. |
| Settings | In Settings, you can fine-tune the way GPS Tuner works for you. |
| Map | The Map screen is the most important screen of GPS Tuner. It displays the map in 2D or 3D mode. |
| Trip Tools | In Trip Tools, you can reach Trip Computer, Graphs and Speedometer functions. |
| About | See the credits, copyright notes and the end-user license agreement. |
| SOS | In an emergency situation, use GPS Tuner to send out an SOS message for you. |

FIG. 46

Basic Operations

| | |
|---|---|
| ⚙ | Opens the Main Menu screen. |
| 🔧 | Opens the Map Settings screen. |
| ▲ N▲ | Changes the map orientation between Track-up and North-up view |
| ⊕ | Moves the map to the GPS position. Your current position is displayed in the centre of both 2D and 3D maps so that you can see your surroundings. |
| ↓ ↺ | Tilts the 3D map up and down. These buttons are available in 3D map view mode only (see Map Settings). |
| ↶ ↷ | Rotates the map left and right. |
| + − | Scales the map up and down. |
| ✏ | Draws a new route on the map. |
| ◣ | Draws a line on the map and measures its length, without creating a new route. |
| 📖 | You can select which My Maps and Detailed Maps are shown on the Map Screen, and you can turn Satellite Images on/off |

FIG. 48

(Map Screen Symbol Key)

Route Options:

| | |
|---|---|
| Details | Tap this button to see the detailed data of the selected routepoint. |
| Locate | Opens the Map screen with the selected routepoint displayed in the middle. |
| Target | The selected routepoint becomes your target. |
| Delete | Deletes the selected routepoint from the list. |
| Delete All | Deletes all routepoints from the list. |
| Up | Moves the selected routepoint up in the list |
| Down | Moves the selected routepoint down in the list |
| Backtrack | Reverses the order of routepoints in the list. |

FIG. 53

(Summary of Options for the "Routes" Screen)

GPS TUNER

CROSS REFERENCES TO RELATED APPLICATIONS

This application claims priority on U.S. Provisional Application Ser. No. 61/214,315 filed on Apr. 22, 2009, the disclosures of which are incorporated herein by reference.

FIELD OF THE INVENTION

The present invention relates generally to improved uses of GPS capabilities, and more particularly to software and apparatus providing enhanced and customizable functionality, in conjunction with GPS positioning, to assist travelers in planning and execution of navigational solutions for personal, recreational, and professional excursions.

BACKGROUND OF THE INVENTION

The Global Positioning System (GPS) comprises a space-based satellite navigation system, which was implemented by the United States, and which provides very accurate and reliable positioning, navigation, and timing services. System development began in secret in the early 1970s by the U.S. Air Force, with insertion of the first satellite into orbit in 1978. But in 1983, after a Soviet interceptor aircraft shot down a civilian Korean Air Lines commercial aircraft that crossed into prohibited airspace due to a navigational error, President Reagan declassified the project, and announced that it would be made available for civilian use once completed. Full operational capability was achieved in 1995, and today, a continually updated array of between 24-32 satellites, in distinctive orbits about the earth, permits a precise three-dimensional location (latitude, longitude, plus altitude) and time determination for a user anywhere in the world-wide. In general, visibility at a position on the Earth's surface of at least four satellites permits normal use of the broadcast signals.

A user's GPS receiver, the third element in the GPS triad, with the first two being space-based satellites and a ground-based satellite control system, has traditionally provided the ability to obtain directional guidance to a destination. One invention providing such ability through the broadcast GPS signals is shown by U.S. Pat. No. 5,177,685 to Davis for "Automobile Navigation System Using Real Time Spoken Driving Instructions." In the Davis invention, the driver inputs information to describe a desired destination The vehicle location system accepts input from a position sensor which continuously measures automobile movement (magnitude and direction), and using this information in conjunction with the map database, the system's algorithm calculates a route. Based on the current position of the automobile and the route, a discourse generating program composes appropriate driving instructions to the destination.

An improvement upon Davis is shown by U.S. Pat. No. 5,933,100 to Golding, which includes a cellular telephone in the automobile for communicating with a central database to obtain traffic updates in order to provide optimum route selection that is weighted to include the dynamic travel time information.

The availability of GPS signal information has also pawned a number of various related inventions, such as U.S. Pat. No. 7,145,507 to Luo for a "Vehicle Locating System Using GPS." The Luo invention includes a car that is equipped with a GPS receiver and a transceiver to transmit the car's location, on demand, to a user's GPS receiver retained as a key-ring fob, which also has a transceiver for receipt of the car's transmitted location, and provides correlation of the car's position relative to the user's position. The Luo invention, while assisting an owner in finding his car, does not significantly expand usage of the basic GPS functionality, but points to another use, which is its application by a pedestrian visiting a foreign city, or an outdoor hiker.

The latter has helped to revolutionize games that have been played for years in a simplistic form by children and adults—that of a treasure hunt. While the traditional Easter egg hunt may occur predominantly in a private home or yard, the modern "treasure hunt" occurs on a grander scale, as shown by U.S. Pat. No. 5,942,969 to Wicks, where players are directed from landmark to landmark on a course by receiving information and clues from a paging system, which may also be used to track the successful navigation of the course by each participant. The proliferation of GPS devices has advanced the game playing to use such devices. U.S. Pat. No. 6,320,495 to Sporgis discloses generally a treasure hunt game utilizing a GPS equipped wireless communications device, where players are given clues or directions for a predetermined treasure hunt route, based on their GPS location. The game has become popularly known under the trademarked name of "Geocaching," which is held by the private company called "Groundspeak." The company's game-centered website—www.geocaching.com—now boasts over one million "active caches" or containers located in over 100 countries and on all continents, including Antarctica. Some advancement and customization for the game has been proffered by U.S. Pat. No. 6,691,032 to Irish, for "System and Method for Executing User-Definable Events Triggered through Geolocational Data Describing Zones of Influence."

Some attempts have been made to conceive devices to assist users in journeying to distant places, based on a series of waypoints, whether for business uses, for Geocaching adventures, or just personal exploration. Some examples are shown by U.S. Pat. No. 6,810,323 to Bullock for "System and Method for Storing and Using Information Associated with Geographic Locations of Interest to a Mobile User"; and U.S. Pat. No. 7,565,240 to Tomizawa for "Navigation device, method, and program."

However, despite the prolific number of GPS devices and related patents heretofore developed and disclosed, there remains a lack of interactive capability and customization that may be incorporated into a device with GPS data supplied therein. The prior art also lacks sufficient capabilities to assist in navigation beyond standard highways and byways. This invention discloses such capability in the form of customizable off-road navigation software for Pocket PC-type devices.

OBJECTS OF THE INVENTION

It is an object of the invention to provide a graphical user interface for a mobile computing device that works in conjunction with a GPS receiver to assist in navigation along a pre-defined route.

It is another object of the invention to provide a user interface that accepts waypoint data from keyed entries, by copying from existing sources, and by a user drawn route on a world-wide digital elevation model displayed on a touch screen.

It is a further object of the invention to provide a graphical user interface that consists of icons that are ergonomically arranged.

It is another object of the invention to provide a graphical user interface that consists of icons that are automatically self-adapting in size according to frequency of use.

It is also an object of the invention to provide a graphical user interface that permits a user to layer a two-dimensional scanned map image onto a three-dimensional terrain map using a calibration process.

It is another object of the invention to provide a graphical user interface that permits layering of both vector based map data and raster based map data in a single view.

It is also an object of the invention to provide a graphical user interface that provides a customizable multi-paneled display of travel statistics.

It is another object of the invention to provide a graphical user interface that provides a virtual compass providing a heading without requiring minimal velocity to obtain heading data.

It is also an object of the invention to provide a graphical user interface that provides a real-time graphical representation of the sun's azimuth angle in a virtual compass.

It is another object of the invention to provide a graphical user interface that provides a means sending a distress message that includes trip statistics to aid in receiving assistance.

Further objects and advantages of the invention will become apparent from the following description and claims, and from the accompanying drawings.

SUMMARY OF THE INVENTION

A GPS tuner provides high precision measurement, mapping, and Geocaching tools for a pocket PC and other mobile computing devices. The tuner provides a graphic user interface that accepts waypoints defining a desired route for navigation by a user, including land, water, and air routes. The waypoints may comprise latitude, longitude, and altitude of a geographical coordinate; user-assigned names to identify the waypoint; identification of the type of waypoint; a description of the waypoint; photos of the waypoint location; and sounds that may be associated with the particular waypoint to aid in recognition.

Waypoints may be inputted into route planning using one of several different means. A user may key in way point data, or the user may copying waypoints from another stored route. The software underlying the graphical user interface also accommodates internet downloading of waypoint data from a Geocaching file, and the importing of data from a GPX file.

A unique aspect of the invention is that it also permits waypoints to be established from a free-form hand-drawn route created by drawing directly on the touch screen, which may simultaneously display a three-dimensional world-wide digital elevation model. The software instantly converts the free-form drawn route into a series of waypoints, and route segments connecting the points. The program also works to refine the coarsely drawn route by smoothing and simplifying the free-form drawn route to eliminate jitters and any waypoints that may be irrelevant for navigation, such as extraneous waypoints along a straight-line route-segment. The program also accommodates inputting additional routes, and will automatically combine a successively drawn route onto the previously drawn route if the second route is started within a distance of 20 pixels from an end point of the first route.

The program also features the capability of overlaying, onto the three-dimensional digital elevation map model, any custom map that a user may wish to use, including satellite images with elevation data, road network maps, topographical maps, and user generated maps. The overlaid map will correctly display on, and correspond to, the three dimensional map, through use of a calibration process. The calibration process involves selecting three distinct geo-reference points on the user's map, where the three points have geo-reference points having known GPS coordinates. The process will permit a view to correctly display one on top of another map image, such as a vector-styled road map layered on top of satellite map or detailed hiker's topographical map layered on top of the satellite photo.

Navigation functions are selectable from a touch screen display of a self-adapting, ergonomically configured, array of icons that form the main menu. The icon are self-adapting through an algorithm that measures frequency of use of the icon's functionality, and causes modification of the icon's size, so that with increasing frequency of use, the icon size increases, and corresponding decreasing use causes icon sizes to decrease.

The software's functionality also allows for sharing of position information with other mobile device users that are also utilizing the GPS Tuner. The shared position information is displayed in the map view, and can be followed in real-time, permitting navigation towards a partner, enabling collaborative activities. The software also permits real-time sharing of saved tracks, routes, training plans, statistics, and other information. The sharing can be limited to users granted permission for the access, or to the public domain.

BRIEF DESCRIPTION OF THE DRAWINGS AND TABLES

FIG. 2A is a screen shot of an alternative main menu screen that may be displayed by the software of the current invention.

FIG. 3 is a screen shot displaying the functions available under the "Presets" icon of the main menu of FIG. 2 or 2A.

FIG. 5 is a screen shot illustrating Base Map data for the North American Continent.

FIG. 6 is a screen shot of a street level data map.

FIG. 7 is a screen shot illustrating the map-overlaying capability of the software of the present invention, after calibration of a user's map results in a three-dimensional overlay onto a base map region.

FIG. 8 is a screen shot illustrating the map-overlaying capability of the software of the present invention by showing a three dimensional view with multiple map layers.

FIG. 9 is a screen shot illustrating draw your own route functionality of the software of the present invention.

FIG. 10 is a screen shot of a three-dimensional terrain elevation map illustrating holding the stylus over a point location to identify the location for planning or current use.

FIG. 11 is a screen shot of options available for the stylus point selection accomplished in FIG. 10.

FIG. 12 is a screen shot of the digital compass generated by the software of the current invention.

FIG. 13 is a screen shot of a first "Waypoint Details" screen that may be accessed using the "Add Waypoint" button in the options screen of FIG. 11 or the first "Trip Manager" screen for FIG. 15.

FIG. 14 is a screen shot of a second "Waypoint Details" screen that may be accessed by toggling the arrow forward button of the first "Waypoint Details" screen of FIG. 14.

FIG. 15 is a screen shot displaying the first of two screens of functions available under the "Trip Manager" icon of the main menu of FIG. 2 or 2A.

FIG. 16 is a screen shot displaying the second of two screens of functions available under the "Trip Manager" icon, and which is accessible using the arrow forward button of the first "Trip Manager" screen of FIG. 15.

FIG. 20 is a screen shot showing the available functions of the "Tracks Segments" screen for the "Track num. 1" of FIG. 19 to manage a user's track logs, and which may be accessed using the "Details" button on the "Tracks" screen of FIG. 19.

FIG. 21 is a screen shot showing the available functions of the "Track Points" screen for the selected "Track seg. num. 1" of FIG. 20, and which may be accessed using the "Details" button on the "Track Segments" screen of FIG. 20.

FIG. 22 is a screen shot showing the details of the "Trackpoint" screen, for the selected "Trackpoint 4" of the Trackpoints listed in FIG. 21, and which may be accessed using the "Details" button on the "Track Points" screen of FIG. 21.

FIG. 23 is a screen shot showing the available option on the "Find" screen when seeking to locate objects, and which may be accessed using the "Find" button on the first "Trip Manager" screen in FIG. 15.

FIG. 24 is a screen shot showing results, in the Find screen, for the 100 m search option executed in FIG. 20.

FIG. 25 is a screen shot showing the available options of the "Record/Playback Log" screen to access and manage a user's NMEA data, and which may be accessed using the "Record/Playback Log" button on the second "Trip Manager" screen in FIG. 16.

FIG. 26 is the screen shot of FIG. 25, but with the drop down menu for the "play speed" button being exposed.

FIG. 29 is a screen shot showing the "Graphs" trip tool.

FIG. 30 is a screen shot illustrating the available graph types which may be displayed in the "Graphs" trip tool of FIG. 29.

FIG. 33 is a screen shot of the options available in the "Settings" screen, which is accessible by toggling the "Settings" icon in the main menu of FIG. 2 or 2A.

FIG. 34 is a screen shot of the options available under the "Systems Settings" screen, which is accessible by toggling the "System" button of the "Settings" screen of FIG. 33.

FIG. 35 is a screen shot of the options available under the first of three "Map Settings" screens, which may be accessed by toggling the "Map" button of the "Settings" screen of FIG. 33.

FIG. 36 is a screen shot of the options available under the second of the three "Map Settings" screens, which may be accessed by toggling the arrow forward button of the "Map Settings (⅓)" screen of FIG. 35.

FIG. 37 is a screen shot of the options available under the "GPS Settings" screen, which may be accessed by toggling the "GPS" button of the "Settings" screen of FIG. 33.

FIG. 38 is the screen shot of FIG. 37, but with the drop down (up) menu for the "distance" button being exposed.

FIG. 39 is a screen shot of the options available under the first of two "Unit Settings" screen, which may be accessed by toggling the "Units" button of the "Settings" screen of FIG. 33.

FIG. 40 is the screen shot of FIG. 39, but with the drop down (up) menu for the "H. speed" button being exposed.

FIG. 41 is a screen shot of the options available under the second "Unit Settings" screen, which may be accessed by toggling the arrow forward button of the "Unit Settings (½)" screen of FIG. 39.

FIG. 42 is a screen shot of the options available under the "Track Settings" screen, which may be accessed by toggling the "Track" button of the "Settings" screen of FIG. 33.

FIG. 43 is the screen shot of FIG. 42, but with the drop down menu for the "Distance" button being exposed.

FIG. 46 is a table that lists a description of the options available with the icons of Main Menu of FIGS. 2 and 2A.

FIG. 47 is a table that lists a description of the buttons available at the bottom of the Main Menu of FIG. 2A.

FIG. 48 is table that is a symbol key for the symbols used in the Map screens of FIGS. 4-9.

FIG. 49 is table that lists a description of the options available in the "Options" screen of FIG. 11.

FIG. 50 is table that lists a description of the methods of setting a target for the virtual compass of FIG. 12 to point towards.

FIG. 51 is table that lists a description of the options available for the "Waypoint Details" screen of FIG. 14.

FIG. 52 is table that lists a description of the options available for the "Trip Manager" screens of FIGS. 15 and 16.

FIG. 53 is table that lists a description of the Route options available for the "Routes" screen of FIG. 18.

FIG. 55 is table that lists a summary of the options available for the "Track Segments" screen of FIG. 20.

FIG. 56 is table that lists a summary of the options available for the "Track Points" screen of FIG. 21.

FIG. 57 is table that lists a summary of the options available for the "Find" screen of FIG. 23.

FIG. 58 is table that lists a summary of the options available for the "Record/Playback Log" screens of FIGS. 25 and 26.

FIG. 60 is table that lists a summary of options and function buttons available for the "Graphs" screen of FIG. 29.

FIG. 62 is table that lists a summary of the options for the "Settings" Screen of FIG. 33.

FIG. 63 is table that lists a summary of the options for the "System Settings" Screen of FIG. 34.

FIG. 64 is table that lists a summary of the options for the "Map Settings" Screens of FIGS. 35 and 36.

FIG. 65 is table that lists a summary of the options for the "GPS Settings" Screen of FIG. 37.

FIG. 66 is table that lists a summary of the options for the "Unit Settings" Screen of FIG. 39.

FIG. 67 is table that is a list of the implemented National Map Grids available under the "Unit Settings" Screen of FIG. 41.

FIG. 68 is table that lists a summary of the options for the track log under the "Track Settings" Screen of FIG. 42.

DETAILED DESCRIPTION OF THE INVENTION

A GPS tuner is disclosed herein in the form of software which provides high precision measurement, mapping, and Geocaching tools. The software is designed so that it may be implemented on a computing device, preferably, a mobile computing device. An exemplary computing system, upon which the software may be utilized, is discusses hereinafter.

Figures 1, 2:
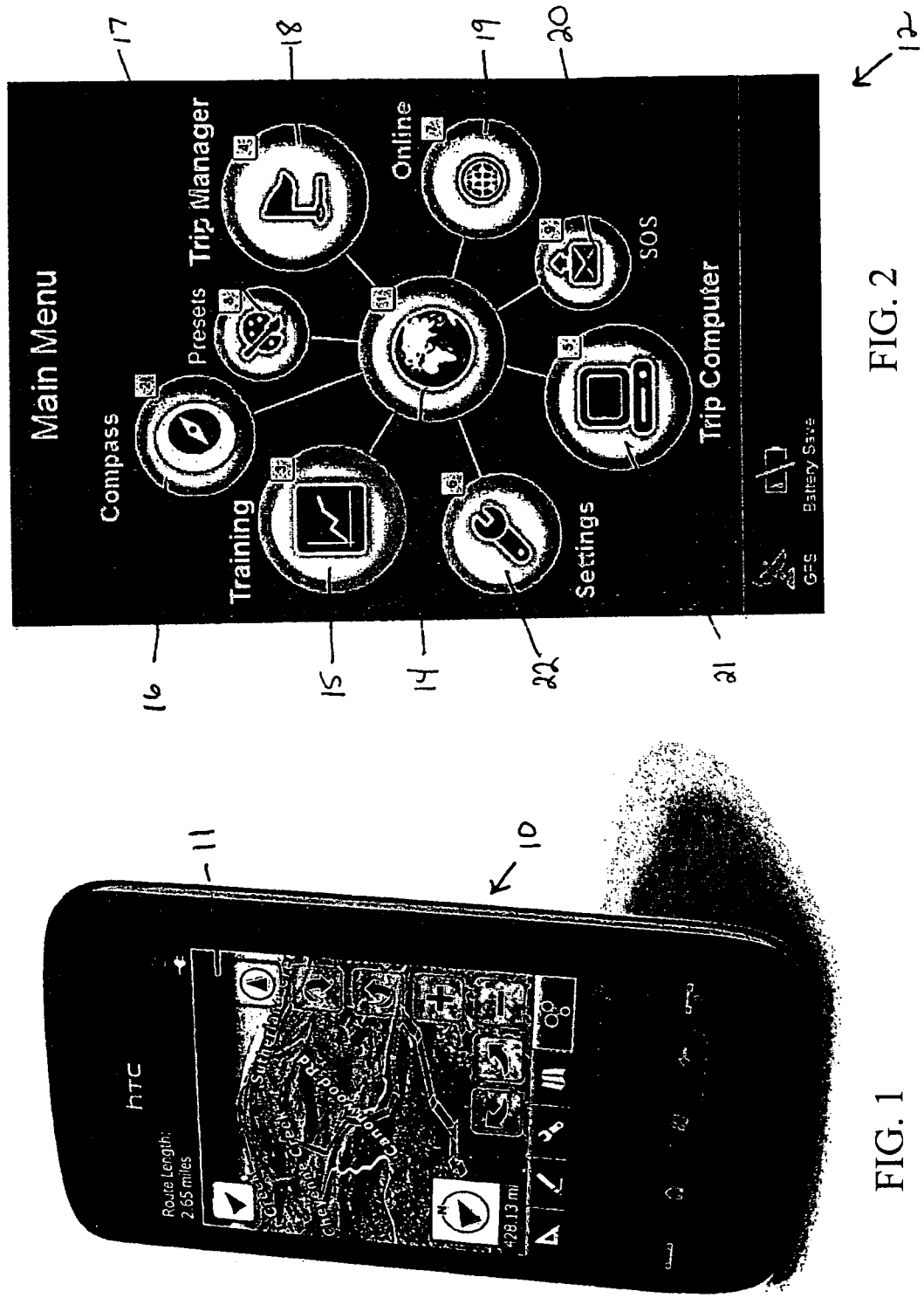
FIG. 1 is a perspective view of a mobile computing device running the software of the current invention.
FIG. 2 is a screen shot of a main menu screen that may be displayed initially by the software of the current invention.

In one embodiment, the software of the current invention may preferably run on a computer system utilizing an underlying operating system, such as Windows Mobile, which is running on a PDA, a Pocket PC, or a Smartphone, such as, for example, the pocket PC 10 depicted in FIG. 1. The device utilized may need to meet certain minimum requirements, such as being capable of running the Microsoft® Windows Mobile™ 5 operating system with a 300 MHz ARM processor (400 MHz recommended), a 64 MB RAM (128 MB recommended), a touch screen display, and approximately a 2 GB file storage space for map content (SD Card or Internal Flash memory). The software may support visualization in portrait mode on handheld screens with 240×320, 480×640, 480×800 (WVGA legacy mode), 240×400 (WQVGA legacy mode) resolutions.

The software is designed and programmed primarily in C++ code, since it is desirable to keep core code as universal and monolithic as possible, but given differing requirements and limitations of various other development kits, it may be necessary to use alternate implementation languages—in whole or in part—in order to implement nearly identical OS versions of the same application.

One unique aspect of the software is that it may provide categories of navigation functions being selectable from a touch screen display 11 of device 10, and which may be both self-adapting, and ergonomically configured. The categories may appear as a main menu 12 (FIG. 2) in the form of an array of icons for each category of the available functions, but forming a graphical layout that differs distinctly from a conventional "matrix" configuration. The ergonomic configuration may comprise an organic arrangement of the icons, where they are located peripherally around a central hub-resembling a star network topology similar to nature-like neural networks. The icons may have round shapes being positioned at the nodes of the network. Based on extensive testing, it has been found that the round shapes and star network nodes helps a user attain faster recognition of the included functions, thus making the GPS Tuner of the current invention easier and faster to learn.

The hub may simply be a non-selectable symbol, as in the alternate menu of FIG. 2A, or it may alternatively be a selectable icon, as in FIG. 2. In the embodiment of FIG. 2, the peripherally located circular icons may be connected graphically by a non-selectable "spoke" to a hub icon, which may be the Map icon 14. The ergonomics of the main menu 12 may be further accommodated by having the sizing of the icons being in relation to their importance, or to their frequency of usage. The most frequently utilized function may preferably have its selectable icon located at the central hub position. Since the map icon 14 will in general be the most frequently used icon, and may perhaps be the most important function, it may occupy the central hub position. In the main menu 12 of FIG. 2, the functions utilized may be the map functions icon 14, the training functions icon 15, the compass functions icon 16, the presets function icon 17, the trip manager icon 18, the on-line (internet) function icon 19, the SOS icon 20, the trip computer icon 21, and the settings icon 22. A summary of the options of these functions is illustrated in FIG. 46, however, they will be discussed in greater detail hereinafter.

The software of the current invention incorporates a self-adapting algorithm to automatically adjust the icon sizes, so that the menu screens are dynamically changing, or constitute a "live" array of icons. The icons may be self-adapting by having the algorithm measure frequency of use of the icon's functionality by the owner/user, and thereafter cause modification of the icon's size, so that with increasing frequency of use, the icon size increases, and corresponding decreasing use causes icon sizes to decrease. It may be seen by comparing the icons of FIGS. 2 and 2A, that the Trip Manager icon in FIG. 2 is larger than the corresponding Trip Manager icon of FIG. 2A, and represents the self-adapting feature of the icons offered by the software of the present invention.

The main menu may preferably appear as seen in FIG. 2A, in that it may have one or more option buttons across the lower portion of the screen in button bar 25. The main menu may feature, in button bar 25, the three symbols shown in FIG. 2A—a round exit button 26 to stop navigation and exit the software application; a GPS receiver symbol 27 that opens the GPS settings screen (discussed later); and the menu button 28, that closes the main menu screen and re-opens the last screen used. (See FIG. 47). The menu button 28 may similarly appear on other function screens discussed hereinafter, and thus may be used to toggle back and forth between each of those screens and the main menu screen 12. The main menu screen may also have one or more symbols across the top of the screen. As seen in the top left corner of the main menu screen, a plug symbol 31 may refer to the battery status of the unit, where the plug means that the unit is being charged. Also, as seen in the top right corner of the Main Menu screen of FIG. 2A, a small color-coded radar symbol 30 may provide the status of a GPS signal. A green radar symbol may indicate a GPS fix (see FIG. 6), a red radar symbol may indicate no GPS fix (see FIG. 5), and a white radar symbol may indicate no GPS receiver connected.

In order to obtain a Global Positioning System satellite position signal and a so called GPS lock—referring to obtaining a valid real-time geographical location coordinate based on the GPS satellite network—a mobile device needs to be connected to a GPS receiver. The GPS receiver's signal is interpreted by a hardware level driver that provides a periodic (1 signal/second intervals or 1 Hz periodicity) position signal to the operating system of the device, and then to the software application. The GPS receiver hardware can be an external unit (connected to the mobile device via a standard IEEE 802.15 wireless connection otherwise called as Bluetooth, Universal Serial Bus, or by other standard means of external connection of such devices); or alternatively may be built-in GPS hardware, as the vast majority of mobile devices and Personal Navigation Devices now offer GPS receiver hardware, including a high accuracy GPS chipset and antenna that is internally connected to the mobile device. On top of the physical connection layer as described above, the GPS receiver needs to be communicating with the mobile device OS in order to provide the periodic position feed on every interval. This logical connection needs to be set up through the data communications port of a particular device that is referred to as COM1, COM2, . . . , COMn. As long as the Operating System is receiving the periodic location data, GPS Tuner can access and process that data into geographical coordinates in real-time. Should for some reason the physical or logical connection is disrupted (a disconnected cable or jammed Bluetooth radio communication), the GPS Tuner will return a warning message that says "GPS is disconnected".

Selection of the presets button 17 from main menu 12 results in the displaying on the touch-screen 11 of the presets screen 33 in FIG. 3. The presets screen permits retention, within a non-volatile memory, of different settings that may be more practical for, or optimized to better accommodate, various different activities. The presets screen 33 may include specialized settings under a hiking button 34, a biking button 35, a driving button 36, a sailing button 37, and a flying button 38. The individualized presets buttons may thus accommodate a wide range of activities for a single user. The device may permit the user to navigate while driving a snowmobile in the Alaska wilderness, or while flying cross-country above the lower 48 states, or pursuing Geocaching sites in Europe, or biking or hunting, or while touring for any number of other activities. Therefore, the route to be navigated by the user may be a land route, a water route, or even an air route.

Figure 4:
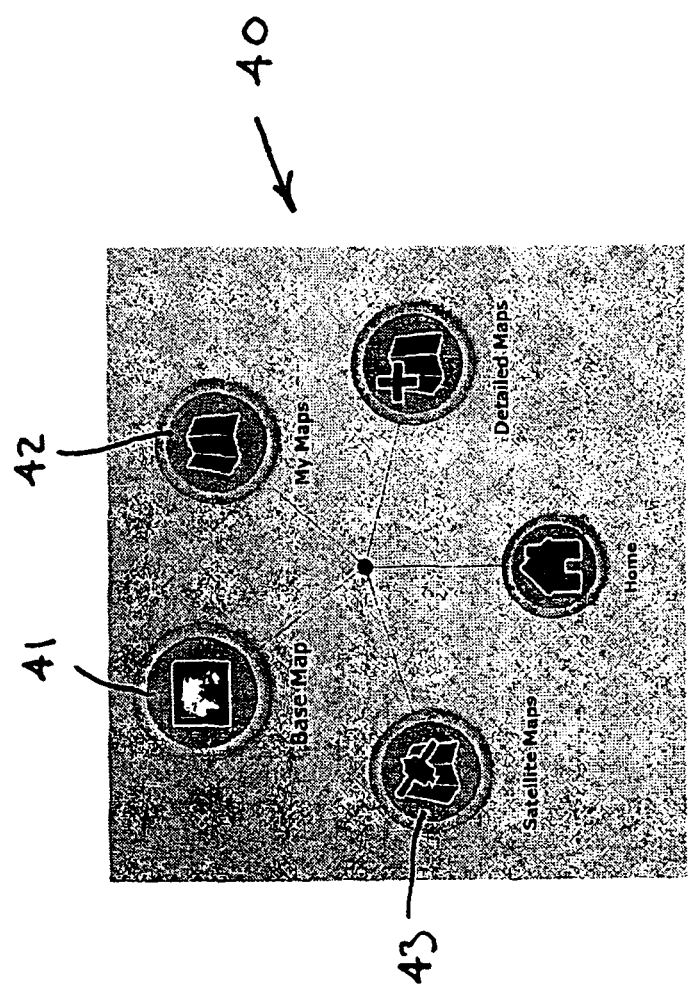
FIG. 4 is a screen shot displaying the options available under the Map Tuner.

Navigation may be according to a pre-defined route that may be mapped upon, or mapped over, any number of different kinds of maps, and the software of the current invention also permits overlaying of multiple map images to be utilized in the viewing screen 11 of the device. Accessing the maps may be through the maps icon 14, which may be a two step process. Maps may initially be manipulated or downloaded using the Map Tuner software on a desktop PC, as discussed hereinafter, which may cause the display of a secondary map menu 40, as seen in FIG. 4. The secondary map menu 40 may comprise icons permitting selection of maps from several different categories. Once the maps are prepared, the second step comprises transfer to the mobile device running the GPS Tuner software, after which they may be accessed using the maps icon 14, which may display a map screen as in FIG. 5, and after which they may be selected using the map selection button 47.

The base map icon 41 for utilizing Map Tuner, in FIG. 4, may preferably be used for downloading and subsequent display of base maps comprising continent-level maps, such as for North America, as seen in FIG. 5, or for Europe, etc. These maps are available in similar fashion as is the software offered by the developer, and as such, it is specifically designed to work in conjunction with the software disclosed herein to provide enhanced functionality. A partnership with Tele Atlas and DigitalGlobe currently provides that downloaded maps, which may be accessible through the on-line function icon 19, are accurate and up to date. The Base maps may be a composition of vector-based road network data (at present from Teleatlas) including its underlying database of road classes, road-names, and a full set of routing rules and road attributes; Point of Interest (POIs) etc.; and three-dimensional topographic elevation mesh-model of the Earth surface (Digital Elevation Model—DEM) that represents mountains and lowlands, canyons and riverbeds and various other geographical features in 3D. The software, because of memory constraints that may be encountered for hand-held devices, stores the world-wide digital elevation model data in a JPEG2000 compressible image to save storage space. The base maps may also contain vector-based road network information.

The software of the current invention flexibly supports different graphics types, meaning that it supports processing and display of both vector-based graphic and raster graphics. Vector graphics means the use of geometrical entities or shapes, such as points, lines, curves, polygon(s), etc., and which are defined using mathematical equations to create the representation of the images in computer graphics. Vector graphics are complementary to raster graphics, and comprise a bitmap or a rectangular grid or array of pixels, typically being used for photographic images. A bitmap may be characterized by the width and height of the image in terms of pixels and by the number of bits per pixel—a color depth, which determines the number of colors it can represent.

The GPS Tuner embodied in the software herein, named as such because of the extensive functionality it provides in addition to that which may ordinarily be attained through a simple GPS device, can display both vector based map data (typically road networks with or without the underlying database of road and street attributes for route planning; and points of interest) and raster based maps (typically scanned paper maps or other picture elements that are suitable for mapping purposes—e.g. satellite and aerial photographs, custom schematics of a geographical area for specific usage etc.) at the same time in the same view. With the addition of all street and topographic map data being mapped on a 3D terrain surface that is rendered from a world-wide Digital Elevation Model (DEM), the GPS Tuner provides a real 3D visualization.

Due to the specific map rendering technology incorporated herein, vector and raster map layers can be layered on top of each other. Hence a satellite image will correctly display on top of the elevation while vector style roads (see the flat two-dimensional street map of FIG. 6) may be shown layered on top of the satellite photos or even a detailed topographic map for hikers can be layered on top of the satellite photos. It may be preferable for the most detailed layer to sit on the top of the stack in order to provide the most comprehensive detailed coverage. This is similar to covering the whole Earth surface with map patches of various resolutions in a way that there are no blank areas left.

The GPS Tuner software herein also enables users to utilize their own maps ("My Map 42—FIG. 4) by using any image stored in one of the most commonly used image formats like JPG, PNG, BMP or GIF. A quick and easy calibration procedure precedes loading the calibrated My Map segment 42A (FIG. 7) into the device, using Map Tuner, which is a PC application that manages GPS Tuner content between the user's Personal Computer and the GPS Tuner software running on the mobile device 10. Map Tuner is designed for managing map data, license rights and various additional elements of GPS Tuner, and was developed for personal computers running on the most commonly used versions of the Microsoft Windows operating system (OS), e.g. XP, Vista, and Windows 7, which can be connected to the mobile device running GPS Tuner (via USB, Bluetooth or other possible standard means of data connection). However, Map Tuner is adaptable for use on mobile devices (PDAs, mobile handsets and specific personal navigation devices or PNDs) using various operating systems like MS Windows Mobile, Windows CE, Google Android, and Apple's iPhone/iPad, despite the fact that they offer limited file storage space, whereas personal computers (desktop workstations, notebooks, netbooks, and mobile interne devices—the so-called MIDs) can store and manage much larger amounts of data due to their built in HDD storage. The system is also adaptable for use on other OS platforms like Mac OS, Linux, or even in an independent Web-based platform.

After opening an image file that contains the map data, the calibration process is executed by clicking three separate geo-reference points that have known GPS coordinates within the custom map coverage area, and assigning those GPS coordinates to the three different points. From the three calibration points, the Map Tuner sub-routine will determine the resolution scale—the number image pixels per degree. During calibration Map Tuner also determines the rotation of the calibrated map and adjusts it in order to match the Base Map. Then Map Tuner processes the image by chopping it up to manageable pieces and renders all versions for different zoom levels, and finally transfers the data to the handheld device. After calibration and automatic synchronization of the calibrated maps into the device storage memory, the GPS Tuner software may display the custom map in 3D rendering on top of the Base Map topology and road network, at the same time. (FIGS. 7 and 8) Map data is managed is smaller units of so-called patches, in order to achieve an optimal memory footprint by loading only necessary amounts of map data into the device memory. Vector data, DEM, and Satellite Imagery share the same patch structure—a mesh. GPS Tuner displays such custom maps as a separate map layer. This way My Maps can be layered with vector type Base Map data or other map elements. By using elevation data (DEM) GPS Tuner display calibrated custom maps in 3D by stretching them onto the elevation topography.

As may be seen by looking at each of the maps of FIGS. 5-9, the maps may be manipulated using touch-screen buttons on the map face, as well as being operated upon using buttons of the button bar 25. FIG. 48 lists the functionality of each of those map-face buttons, and does not require a detailed discussion beyond those descriptions. However, as to the button bar options, it should be pointed out that for the wrench symbol 45, although it may serve to open the map settings screen while the user is viewing a map, it may similarly appear on many other screens to serve in accessing the respective settings screens as well. The button in the button bar 25 that resembles a writing implement comprises the "draw your route" button 48, and serves to aid a user in creating a free-form route, and its associated waypoints.

A way point generally is a set of coordinates which identify a point in three-dimensional space. For navigation purposes upon the earth's surface, particularly the seas or generally flat terrain, the coordinates usually comprise longitude and latitude. The coordinate may also comprise altitude, which may be meaningful for hiking along topography with steep elevation changes, as well as for defining an air route for a user flying tracking along a 3D course above the earth's surface. The historical equivalent of a waypoint may be considered to be a distinctive landmark, such as a rock formation, a water body, a forest, a mountain, etc. The use of "waypoints" has come to have widespread meaning for use in advanced navigation systems, such as for the Global Positioning System (GPS). For use herein, they may comprise points of a route to create discrete route-segments that together form a pre-designated route from a beginning point to an end point, and the waypoints need not correspond to any particular physical feature.

Free-form route planning is usually done in other systems by defining individual waypoints, and that capability is included in the software of the current invention. However, the GPS Tuner offers an easy and more dynamic solution for defining routes. A user can actually draw a free-form route using a stylus that contacts the touch-screen, which is displaying the 3D topographic surface. (See FIG. 8). The GPS Tuner software instantly converts the free-form drawn route into a series of waypoints and route segments, and stretches the drawn route onto the DEM surface—regardless of the tilting angle of the actual map view. So the map view does not have to be in a perpendicular top-down perspective in order for the route to correctly lie upon the DEM surface. The surface can be tilted in any angle other from 90°.

With this drawing method, free-form route planning becomes much faster and easier. The GPS Tuner software will even smooth and simplify routes in order to eliminate jitters and useless waypoints by intelligently removing points that are irrelevant for navigation (e.g. a straight route segment will be represented by a start and an endpoint after the automatic conversion.)

The drawn route is instantly displayed in the map screen, and the user can keep the first route or draw a new one. In addition, consecutive additional route segments can be easily added by continuing drawing. Where another drawn route starts within a 20 pixels distance from the end point of the previous route, the software causes the two free-form routes to automatically be joined into a single route, thus providing flexibility into route planning.

In addition to creating waypoints in the usual fashion, or by the drawn route method just described, the GPS Tuner software permits entry of waypoints for a route from several other different means. The GPS Tuner permits one or more waypoint to be inputted by copying existing waypoints from another route stored in non-volatile memory, or by downloading waypoints from a Geocaching file, or by importing waypoints from a GPX file. These waypoints in GPS Tuner comprise high precision waypoints, having sub-meter accuracy.

Lastly, there is yet another means of creating waypoints to define a route in GPS Tuner. As seen in FIG. 10, rather than drawing a free form route using the stylus, a user may carefully select individual waypoints by holding the stylus down over the desired point 49 on the map for approximately one or more seconds, to cause a menu of options 50 to pop up. The options menu 50, as seen in FIG. 11, may include an "Add Waypoint" button. Selection of the button causes the display of the first of two "Waypoint Details" screens (FIGS. 13-14). These screens, which may be similarly accessed at other places in the program (see Trip Manager Screen of FIG. 15), permit a user to add a photo or associated sound or a waypoint description for the particular waypoint. The second "Waypoint Details" screen also permits the user to see the points coordinates, or to manage the waypoint using additional function buttons, such as the "locate," "target," "delete," and "add" buttons of FIG. 14, which are described in FIG. 51.

If the "Set as Target" button of the pop-up options of FIG. 11 is selected, the digital compass screen 55 of FIG. 12, which may also be accessed using the compass icon 16 of the main menu, will then track to the point. The digital compass is a virtual compass that indicates heading based on conventional East-West South-North directions, showing north as a reference. The digital compass may use the data of a built-in electronic compass. An electronic compass chipset relies on the orientation of the Earth's magnetic field—just like a regular compass needle, save for the internal moving parts. Such an e-compass chipset calculates its actual orientation relative to the Earth magnetic field based on very low energy electromagnetic signal induction that is due to the interaction of the chipset itself with the Earth magnetic field. The digital compass resembles a conventional compass in order to make usage easy for everyone who may be familiar with using a regular compass to find their bearings. Apart from showing heading and North, the GPS Tuner digital compass has an additional key function—it provides real-time information about direction and distance of the target set in GPS Tuner. Users may select a map target point, as stated above, or alternatively by entering a GPS coordinate. Then in Digital Compass view, an arrow icon shows the direction of the target.

The GPS Tuner software running on the device 10 of FIG. 1 will preferably be coupled with a GPS receiver to selectively display on the screen, instantaneous positional data to interactively report on the progress being made in regard to a route. The GPS Tuner may also record such positional data as tracks made by the user along a planned or unplanned route, for later use. The virtual compass screen may display additional statistical information in three customizable data fields found at the bottom of the screen 55. The panels are customizable for the statistics of choice for the particular user, and the customization process will be discussed in more detail in relation to the trip computer screen. The panel configuration on the virtual compass may be saved and loaded thereafter as a preset.

As seen in FIG. 12, the panels may preferably be set to display the distance to the target, the altitude, and the speed. However, unlike standard the Global Positioning System units, which have a technological limitation—in that they can only determine heading when a minimal velocity is reached and not for a static position—the GPS Tuner Sun Compass can provide accurate heading information with no movement at all.

In addition, based on GPS coordinates and accurate time information that is broadcast by the GPS system satellites, the Sun azimuth can be calculated by the software. The sun azimuth is the actual heading under which the Sun is visible in the sky from the observer's position. The GPS Tuner sun compass provides a real-time visual representation of the sun's azimuth by rendering a sun icon 56 in the compass screen 55. In a static position with turning the handheld device around a vertical axis and aligning the on-screen sun icon with the actual sun's azimuth the digital compass needle is pointing to north, thus providing a standard reference heading for orientation.

As mentioned previously, the trip manager icon 18 of main menu 12 may be selected to reveal a first trip manager screen 60 and a second Trip manager screen 65, in FIGS. 15 and 16 respectively. The load button permits the user to open a GPX file or KML file having points of interest (POIs), and the "save" button permits the user to store waypoints, track logs, and route data.

Figure 17:
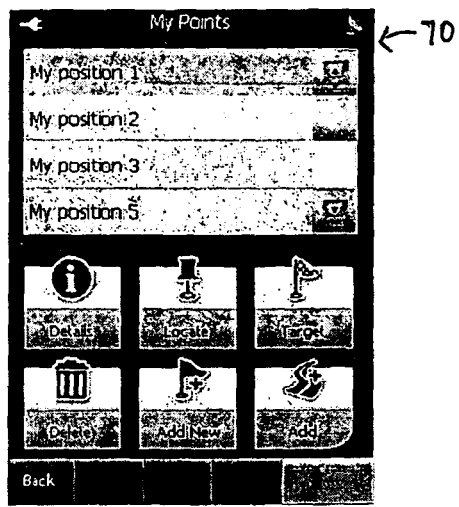
FIG. 17 is a screen shot showing the available functions of the "My Points" screen, which may be accessed using the "My Points" button on the "Trip Manager" screen of FIG. 16.
Figure 17A:
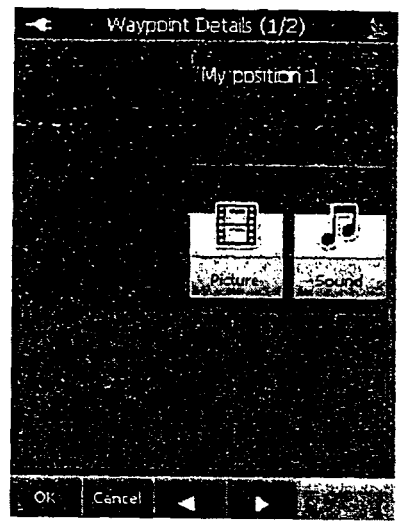
FIG. 17A is a screen shot of the first "Waypoint Details" screen for the "My Position 1" point, and which is accessible using the "Details" button on the "My Points" screen of FIG. 17.
Figure 18:
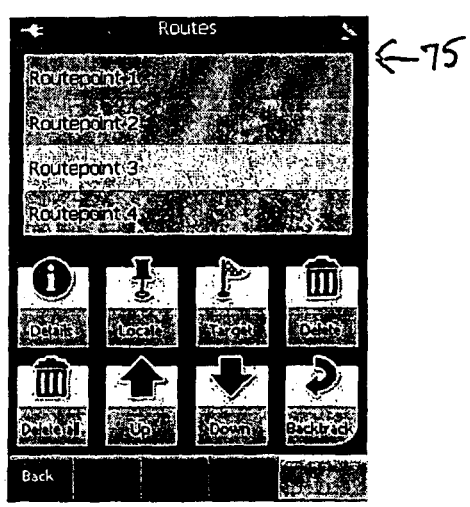
FIG. 18 is a screen shot showing the available functions of the "Routes" screen, which may be accessed using the "Routes" button on the "Trip Manager" screen of FIG. 16.
Figure 18A:
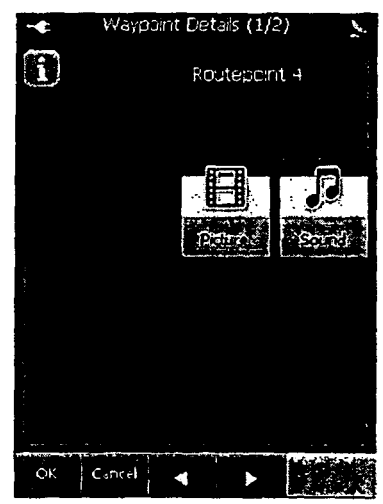
FIG. 18A is a screen shot of the first "Waypoint Details" screen for the "Routepoint 4" point, and which is accessible using the "Details" button on the "Routes" screen of FIG. 18.
Figures 19, 54:
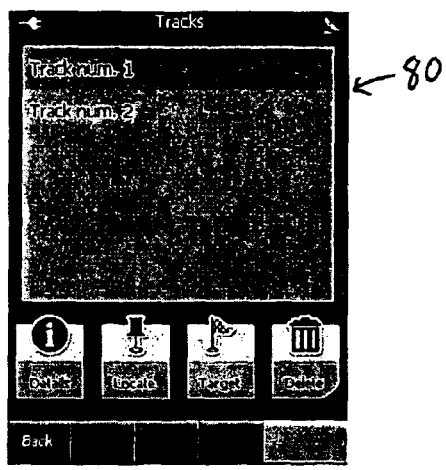
FIG. 19 is a screen shot showing the available functions of the "Tracks" screen to manage a user's track logs, which may be accessed using the "Tracks" button on the "Trip Manager" screen of FIG. 16.
FIG. 54 is table that lists a summary of the options available for the "Track Screen" screen of FIG. 19.

The "my points" button of the second trip manager screen 65 may be tapped to open the list of waypoints, as seen in the "my points" screen 70 of FIG. 17. The buttons on the "my points" screen 70 permits the user to manage the points. The "my points" screen function buttons are described in FIG. 53, but in particular, for selection of the "details" button, the software will cause the first "waypoint details" screen to be displayed, and in this case, as seen in FIG. 17A, it will be displaying the point selected from the "my points" screen—namely "My position 1." Similarly, selection of the "routes" button from the second trip manager screen 65 will cause the "routes" screen 75 to be displayed (FIG. 18), and selecting the details button for "Routepoint 4" will cause the displaying of the second "waypoint details" screen for the Routepoint 4, as seen in FIG. 18A.

As may be seen by sequentially viewing FIGS. 19-22, levels of details are accessible within the Tracks options. Selecting the "Tracks" button from the second trip manager screen 65 may cause the tracks screen 80 to be displayed, which shows the list of track logs—Track num 1, Track num 2 . . . . If one of the track logs is chosen and the details button selected in FIG. 19, the "Track Segments" screen 85 will be displayed, as seen in FIG. 20. The track segments can therein be manipulated (see FIG. 55 options), including reversing the order in the track segments to create a route. This function may be invaluable for a traveler who journeys long distances off-route in complex terrain, and then seeks to return along the same route by "backtracking," rather than just setting a direct heading back to the point of origin. Selecting, for example, "track seg. num. 1" from the "Track Segments" screen 85, will cause the "Track Points" screen 90 to be displayed, with manipulation therein possible according to the FIG. 56 options. Lastly, selection of one of the track points displayed in the "Track Points" screen 90, for example "Trackpoint 4," and toggling of the details button therein will cause the displaying of the "Trackpoint" screen 95, which displays details, and which may be modifiable by backing up to the "Track Points" screen 90 to execute options allowed at that level.

Selection of the "Find" button from the first "Trip Manager" screen 90 of FIG. 15, may cause the displaying of the "Find" screen 100 of FIG. 23. The Find screen 100 permits a user to search for objects in the vicinity, and may limit the search radius to within a specific distance. Other options for a search using the Find screen are shown in FIG. 57. Results of the search on the Find screen 100 are displayed in a second "Find" screen 105, as seen in FIG. 24.

The second Trip Manager screen 65 offers another helpful feature—the Record/Playback Log button (FIG. 16), which may cause the display of the "Record/Playback Log" screen 110 (FIG. 25). The Record/Playback Log screen 110 permits the user to save NMEA data. NMEA refers to a specification developed by the National Marine Electronics Association that defines an interface between various pieces of marine electronic equipment, and includes the NMEA 0183 standard and the newer NMEA 2000 standard, with the disclosures of each being incorporated herein by reference. GPS receiver communication is defined according to this standard. Computer systems which must track or provide real time position information generally communicate according to the NMEA standard, which comprises sending discrete lines of data, referred to as sentences, in that specific format.

NMEA data within the GPS Tuner holds raw NMEA sentences which come directly from the GPS Receiver. The GPS Tuner software, by hitting the "recording" button, can record this data into a .txt file. The GPS Tuner can also open this kind of .txt file (which contains NMEA data), read it, and process the NMEA data, during playback by selecting "Play," the same way as if the software was receiving real-time NMEA data from the GPS Receiver—with the result being a simulation of the original GPS reception.

By pressing the record button on the Record/Playback Log screen 110, the user can set the location and name of the NMEA file that he or she desires to save, and by pressing the "Ok" button, the GPS Tuner starts recording the NMEA sentences automatically. Playback may be according to a selected speed from a drop down menu (FIG. 26), and the progress of which may be monitored or portions skipped by using the trackbar (FIG. 25).

Figure 27:
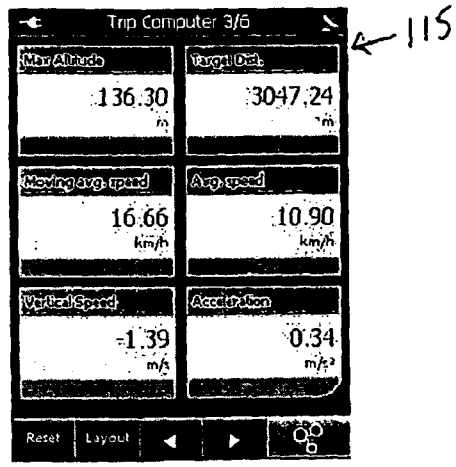
FIG. 27 is a screen shot displaying one possible configuration for the third of six available "Trip Computer" screens, which are available by toggling the "Trip Computer" icon in the main menu of FIG. 2 or 2A.
Figure 59:
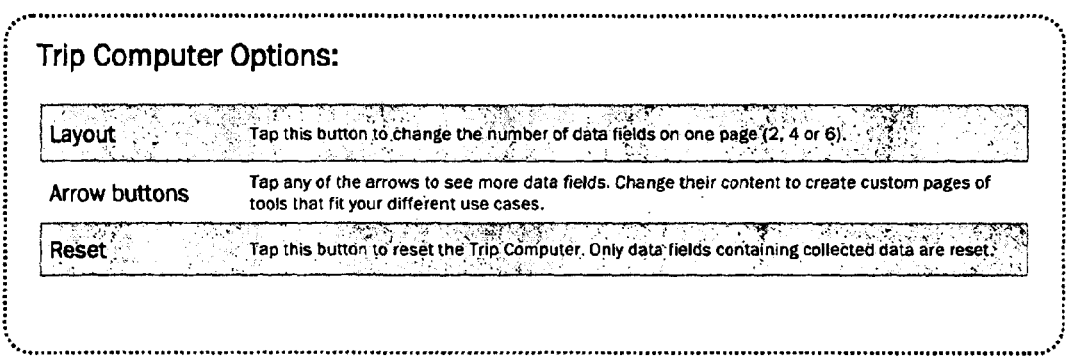
FIG. 59 is table that lists a summary of the function buttons for manipulating the "Trip Computer" screen of FIG. 27.

Selection of the Trip Manager icon 18 from the main menu 12 of FIG. 2 may cause a "Trip Computer" screen 115 to be displayed on the touch-screen 11 of device 10. The GPS Tuner software provides for six different trip computer screens, and FIG. 3 illustrates a third Trip Computer screen 115 of such six possible screens. The trip computer helps users to analyze statistics that are recorded during walking, hiking, bike riding or training, thus providing valuable calculated statistics like average speed, moving time, ascend and descend rate, max. altitude, sunset and sunrise time at the present geographical location etc. The trip computer in the GPS Tuner software is unique because of its highly customizable layout. Users can choose from a 2 panel, a 4 panel, or a 6 panel layout configuration, by selecting the layout button on the button bar of FIG. 27. Each of the panels may be altered individually to display stats fields desired by the user. Tapping on any of the panels causes a list to appear in the form of the "Change Trip Tool" screen 120, which offers a full selection of stats that can be mapped to display in the active data field. Therefore, it is an easy exercise to replace average speed with actual velocity at the tap of just a couple of screen buttons.

Toolsets are saved and reloaded automatically upon the next start of GPS Tuner as well. When a user selects another preset, tool layout automatically changes according to the preset configuration. There are about 40 trip tools currently available, including: Acceleration (change in velocity over time); Acceleration from 0 to 100 km/h (the time it takes to accelerate from 0 to 100 km/h, or from 0 to 60 mph); Acceleration from 80 to 120 km/h (the time it takes to accelerate from 80 to 120 km/h, or from 40 to 80 mph); Actual Time (when GPS Fix is OK, system will display GPS corrected Time); Altitude (elevation above sea level of your current position); Average Speed (your average speed during your trip); Battery (percentage of your battery power); Climb Distance (total length while you are climbing—moving upward); Climb Elevation (total elevation while you are climbing); Climb Rate (percentage of climbing during your Trip); Climb Time (total time while you are climbing); Descend Distance (total length while you are moving downward); Descend Elevation (total elevation while you are moving downward); Descend Rate (percentage of moving downward during your trip); Descend Time (total time while you are moving downward); Deviation (difference of your Averaged position and position reported of GPS Receiver); Direction (your actual heading direction); Easting (easting coordinate of your current position); Flat Distance (total length while you are moving flat—without climbing/descending); Flat Rate (percentage of moving flat during your trip); Flat Time (total time while you are moving flat); Latitude (latitude of your current position); Length (total length of your trip); Longitude (longitude of your current position); Max Acceleration (maximum of your acceleration during your trip); Max Altitude (maximum altitude during your trip); Max Speed (maximum speed during your trip); Min Acceleration (minimum of your acceleration during your trip); Moving Average Speed (your average speed during your movement—not including static time); Moving Time (time during your movement); Northing (northing coordinate of your current position); PDOP (Dilution of precision); Speed (current ground velocity); Sunrise (time of sunrise); Sunset (time of sunset); Target Distance (distance to the target—if target selected); Tilt (vertical angle of your movement vector); Total Time (total time of your trip); and Vertical Speed (your current Vertical Speed).

Figure 27A:
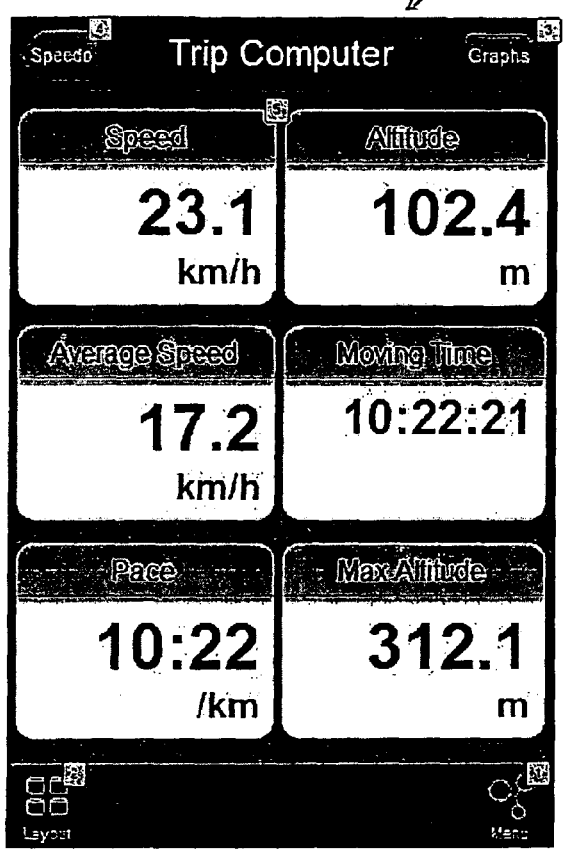
FIG. 27A is a screen shot displaying an alternate embodiment for the "Trip Computer" screen of FIG. 27, but again using a six-panel configuration.
Figure 28:
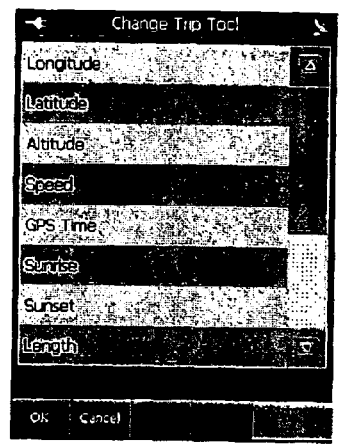
FIG. 28 is a screen shot showing the first 8 of the 41 available trip tools, each of which may be loaded into a panel of the Trip computer to be monitored by the user.
Figure 31:
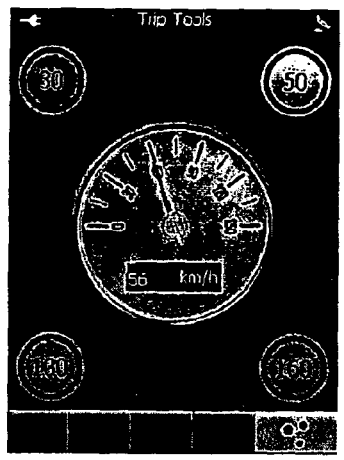
FIG. 31 is a screen shot of the "Speed Limit" trip tool.
Figure 32:
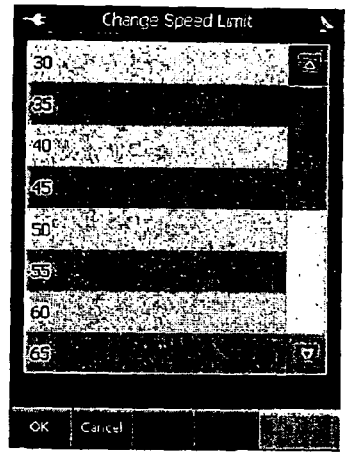
FIG. 32 is a screen shot of the options available under the "Change Speed Limit" screen, which may be accessed by tapping on one of the speed limit circles of the "Speed Limit" trip tool of FIG. 31.
Figure 61:
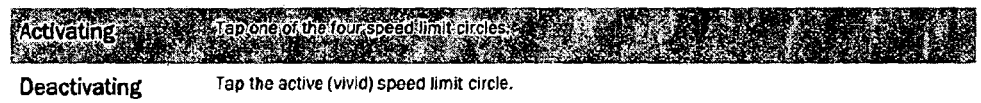
FIG. 61 is table that lists a summary of the options for the "Trip Tools" Speedometer Screen of FIG. 31.

An alternate embodiment of the Trip computer screen 115A appears in FIG. 27A, and provides a means for immediately toggling to a graphs display, which may also be set as one of the Trip computer screens. The "Graphs" screen 125 of FIG. 29 exemplifies one of the many graphs that may be displayed to track statistics of a user's progress. The different types of graphs that are displayable are shown in the "Graph Type" screen of FIG. 30. Each graph, as seen in FIG. 29, may have function buttons that permit manipulation of the graphical image, as described in FIG. 60.

Selection of the settings icon 22 causes the displaying of the "Settings" screen 145 of FIG. 33. The Settings screen 145 provides buttons to alter the default settings in regard to the GPS, Maps, the Units, the System, Tracks, Display, and the SOS system of the software of the current invention. Each of those "settings" options have respective screens that are displayed in FIGS. 33-42, and have FIGS. 62-68 that describe the options therein.

The first unit settings screen in FIG. 40 may allow the user to customize the units for the values displayed in the various distance statistics, speeds, and acceleration, to be within either the English system or the Metric system. For example, in the drop-down menu shown for H. Speed (horizontal speed) was mph (miles per hour), but may alternatively be km/h (kilometers per hour) or knots or m/s (meters per second).

The second unit settings screen permits changes to the units used for coordinate locations, to be in degrees, minutes, seconds, or in degrees, decimal minutes, or in decimal degrees. In addition, the second unit settings screen permits changes to be made to the system as to the coordinate datum system for the map data. Different systems are needed because the earth is not a perfect sphere, and instead is more closely approximated by a biaxial ellipsoid, whereby the bulging at the equator produces and equatorial radius approximately 0.3% larger than the radius through the north and south poles. Even beyond that shape distinction, the Earth is not a static entity, as relative motion is caused by continental plates shifting, subsidence, and diurnal movement as a result of the Moon and the tides. This daily movement can be as much as one meter. Furthermore, it has been shown that Scandinavia is rising by one centimeter per year as a result of melting ice, whereas its nearby neighbor of Scotland is rising only roughly 0.2 centimeters per year. These differences are not significant if a local datum is used, but become significant when a global datum is used. Therefore datums for making maps are chosen by national cartographic organizations to best represent the region.

The latitude and longitude for a given coordinate can therefore be based on several different geodetic systems. The most common system is the World Geodetic System of 1984-WGS84, which is used by most GPS equipment. The United Kingdom, as an example, uses three different coordinate systems, and the British system OSGB36 differs at the southeast London district of Greenwich from the WGS84 system by 112 meters, and may vary oat other locations by as much as 140 meters or 450 feet. For purposes of surveying land or finding a particular dive location, these errors are quite significant.

The differences between coordinates for various systems is referred to as a datum shift, however, coordinates for one mapping system can be changed into another datum using a translation. The software of the current invention implements many different national grid systems, as shown in FIG. 67 and selectable in the second unit settings screen of FIG. 41, which is important since the system readily accommodates calibration of a user's maps that may be based on any of these systems.

Figure 44:
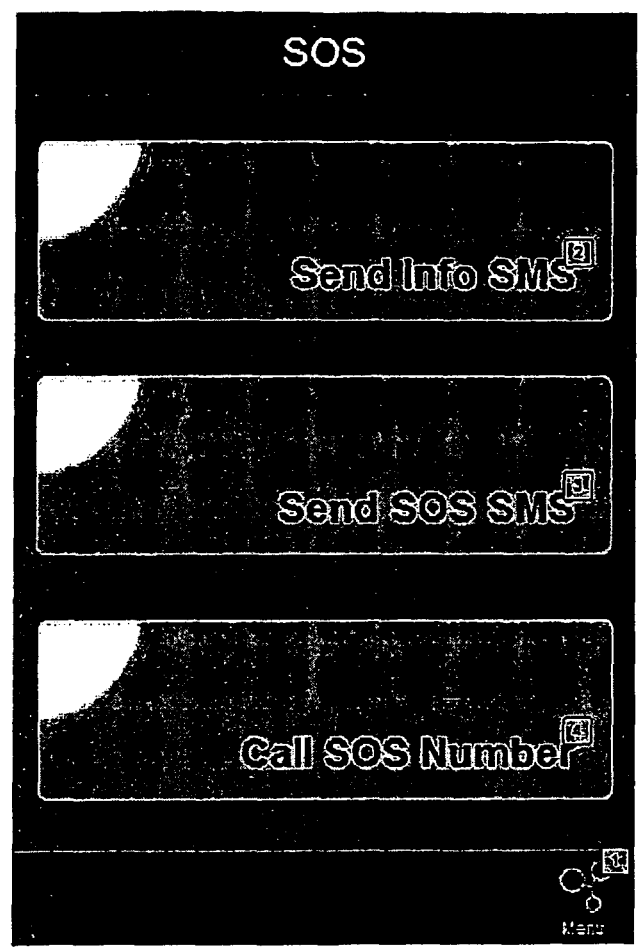
FIG. 44 is a screen shot displaying the "SOS" functions available under the "SOS" icon of the main menu of FIG. 2 or 2A.

The SOS screen in FIG. 44 may be used to send an emergency message, where SOS traditionally represents the international Morse code distress signal, which, although the letters have no inherent meaning, eventually became associated with the phrases. "save our ship" and "save our souls." The emergency message may be sent via SMS service or email, based on predefined contact data. SMS, or short messaging service, is the communication service component of the Global System for Mobile communication (GSM), which is the most popular standard for the mobile telephone systems in the world.

An SOS message of the GPS Tuner may contain actual GPS position, device stats, and type of emergency (informal, general emergency, medical emergency or severe injury). The SOS message may contain: E-mail/phone number of sender; actual geographical position as WGS84 (GPS uses the same) coordinates; and battery life expectation of the sending device. The SOS function is only operable when the sending device that runs GPS Tuner has access to cell phone network coverage (GSM, WCDMA or satellite phone).

The software's functionality also allows for sharing of position information with other mobile device users that are also utilizing the GPS Tuner. The shared position information is displayed in the map view, and can be followed in real-time, permitting navigation towards a partner, thus enabling collaborative activities. The software also permits real-time sharing of saved tracks, routes, training plans, statistics, and other information. The sharing can be limited to users granted permission for the access, or to the public domain. GPS Share service is a service of GPS Tuner that is accessible via an internet web service that provides registration and login and access management functions. After setting up groups and privacy configurations, only designated users will see the real-time position that is shared specifically. Users need to log in with GPS Tuner software user account in order to access GPS Share functionality. GPS Share service can be switched on and off within GPS Tuner. As long as the service is active the user's position is visible by all others who have been previously granted permissions, and the user can also see the others who similarly granted permissions to access their position information. Apart from real-time position sharing users can share their previously saved tracks, routes, POIs, training plans and statistics. The GPS Share website offers a selection of previously uploaded content like routes, POIs and trainings with a full set of stats indicating altitude, speed and acceleration on a visual graph. The GPS Share website offers a comparison function in order to compare recorded data with previously recorded and uploaded tracks, trainings etc.

Figure 45:
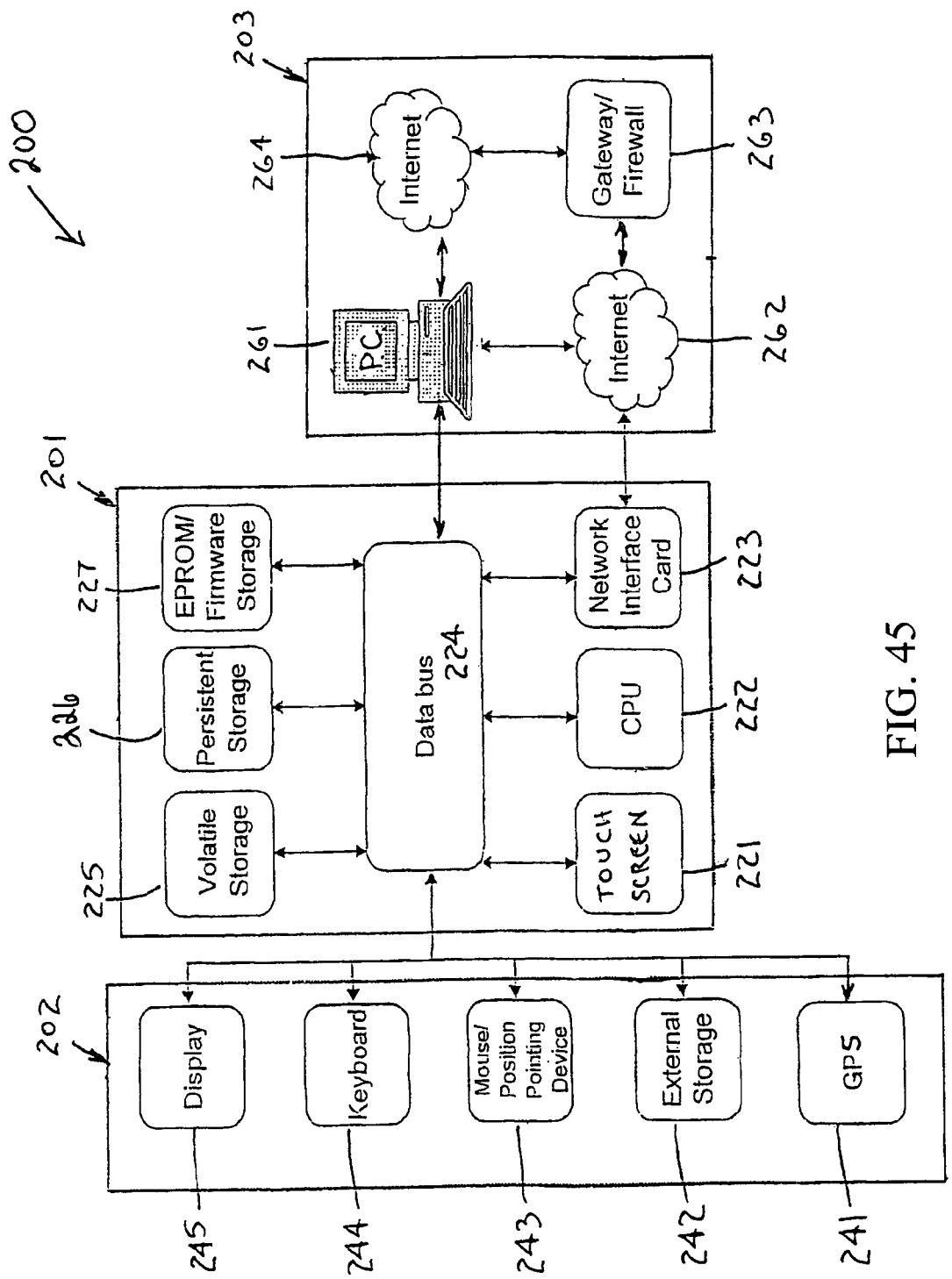
FIG. 45 is a schematic of an exemplary mobile computing unit interacting with external peripherals such as a separate GPS receiver, and interacting with network resources, including a PC.

The GPS Tuner software, in accordance with one embodiment of the present invention, may run on an exemplary computer system 200, which is shown schematically in FIG. 45, and which may comprise a mobile computing unit 201 interacting with external peripherals 202, such as a separate GPS receiver 241, and interacting with network resources 203, including a PC 261. A complete exemplary computer system will be described for an understanding of how the GPS Tuner software may interact with and on mobile computing unit 201, even though an embodiment involving usage of the software may not require each of the described computer components.

The mobile computing unit 201 may include a data bus 224 or other communication mechanism for communicating information across and among various parts of mobile computing unit 201, and a central processing unit ("processor" or CPU) 222 coupled with a bus 224 for processing information and performing other computational and control tasks. Mobile computing unit 201 may also include a volatile storage 225, such as a random access memory (RAM) or other dynamic storage device, coupled to bus 224 for storing various information as well as instructions to be executed by processor 222. The RAM may be Dynamic Random Access Memory (DRAM), or Static RAM (SRAM), or any other similar type of RAM known in the art. The volatile storage 225 also may be used for storing temporary variables or other intermediate information during execution of instructions by processor 222. Mobile computing unit 201 may further include a read only memory (ROM) or an erasable programmable memory (EPROM) 227 or other static storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device is provided and coupled to bus 224 for storing information and instructions.

Mobile computing unit 201 may be coupled via bus 224 to a touch screen display 221, such as a plasma display, or a liquid crystal display (LCD), for displaying information to a user of the mobile computing unit 201. If desired, the mobile computing unit 201 may also be coupled via bus 224 to an external display screen 245, which may further comprise a cathode ray tube (CRT). An external input device 244, including alphanumeric and other keys, may also be coupled to bus 224 for communicating information and command selections to processor 222. Another type of user input device is cursor control device 243, such as a mouse, a trackball, or cursor direction keys for communicating direction information and command selections to processor 222 and for controlling cursor movement on display 245, if desired. Also, a cursor control device 243 may also be utilized for the PC 261 of the network resources 203.

An external storage device 242 may be connected to the mobile computing unit 201 via bus 224 to provide an extra or removable storage capacity for the mobile computing unit 201. In an embodiment of the computer system 200, the external removable storage device 242 may be used to facilitate exchange of data with other computer systems.

According to one embodiment of the invention, the techniques described herein are performed by mobile computing unit 201 in response to processor 222 executing one or more sequences of one or more instructions contained in the volatile memory 225. Such instructions may be read into volatile memory 225 from another computer-readable medium, such as persistent storage device or non-volatile memory device 226. Execution of the sequences of instructions contained in the volatile memory 225 causes processor 222 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 226. Volatile media includes dynamic memory, such as volatile storage 225. Transmission media includes coaxial cables, copper wire and fiber optics, including the wires that comprise data bus 224. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 222 for execution. For example, the instructions may initially be carried on a magnetic disk from a remote computer. Alternatively, a remote computer can load the instructions into its dynamic memory and send the instructions over a telephone line using a modem. A modem local to computer system 200 can receive the data on the telephone line. The bus 222 may carry the data to the volatile storage 225, from which processor 222 retrieves and executes the instructions. The instructions received by the volatile memory 225 may optionally be stored on persistent storage device 226 either before or after execution by processor 222. The instructions may also be downloaded into the mobile computing unit 201 via Internet using a variety of network data communication protocols well known in the art.

The mobile computing unit 201 may also include a communication interface, such as network interface card 223 coupled to the data bus 222. Communication interface 223 provides a two-way data communication coupling to a network link that may be connected to a local network 262. For example, communication interface 223 may be an integrated services digital network (ISDN) card or a modem to provide a data communication connection to a corresponding type of telephone line. As another example, communication interface 223 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 223 sends and receives electrical, electromagnetic or optical signals that carry digital data streams representing various types of information.

Network link 223 typically provides data communication to other network resources. For example, the network link may provide a connection through local network 262 to a host computer 261, or the mobile computing unit 201 may connect directly to the host computer 261. Alternatively, the network link 223 may connect through gateway/firewall 263 to the wide-area or global network 264, such as an Internet. Thus, the mobile computing unit 201 can access network resources located anywhere on the Internet 264. On the other hand, the mobile computing unit 201 may also be accessed by others, with permission, who are located anywhere on the local area network 262 and/or the Internet 264. The other users may themselves be operating a platform similar to computer system 200.

Local network 262 and the Internet both use electrical, electromagnetic or optical signals that carry digital data streams. The signals through the various networks and the signals on network link and through communication interface 262, which carry the digital data to and from mobile computing unit 201, are exemplary forms of carrier waves transporting the information.

Mobile computing unit 201 can send messages and receive data, including program code, through the variety of network(s) including the Internet 264 and LAN 262, network link and communication interface 233. In the Internet example, when the mobile computing unit 201 acts as a network server, it might transmit a requested code or data for an application program running on PC 261 through the Internet 264, gateway/firewall 263, local area network 262 and communication interface 223. Similarly, it may receive code from other network resources.

The received code may be executed by processor 222 as it is received, and/or stored in persistent or volatile storage devices 226 and 225, respectively, or other non-volatile storage for later execution. In this manner, computer system 200 may obtain application code in the form of a carrier wave.

The present invention is not limited to any specific types of wireless or wired network protocols. A network configuration may be achieved using a variety of known networking protocols.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

I claim:

1. A GPS-based navigation method using a mobile navigation device having a touch screen display, comprising the steps of:
   (a) determining the actual position coordinate data of said device by a GPS receiver unit;
   (b) storing said data in a memory;
   (c) storing digital map information of an area including the actual position of said device, said digital information comprises at least latitude and longitude and preferably altitude map data of said area;
   (d) displaying a function menu on said display comprising a plurality of function fields, each field is associated with a main function for selecting a sub menu associated with said function, wherein said fields including at least:
      (i) a map field for selecting a map sub menu,
      (ii) a trip manager field for selecting a trip manager sub menu,
      (iii) a trip computer field for selecting the display of predetermined trip data,
      (iv) a setting field for selecting different setting functions,
   (e) counting and storing the number of repeated selection of said fields during repeated uses of said device; and
   (f) increasing the size of said displayed fields which are used more frequently relative to the size of fields used less frequently to increase thereby comfort of use; and
   (g) arranging a predetermined number of function key fields away from a central area of said touch screen to enable easy selection of frequently used adjustment tools or functions; and
   (h) navigating the user in line with his/her selected and adjusted options, wherein said map sub menu enables the selection of the display of at least three different type of maps differing from each other in scale, source of origin and information content; said trip manager sub menu enables the selection of waypoint management, a route management including a find and a target setting function, and a route storage and/or retrieval function; said trip computer sub menu allowing display of predetermined route- and position-related information and data.

2. The method as claimed in claim 1, wherein said fields are represented by respective circular areas placed around the most frequently used field positioned in a central zone of said display.

3. The method as claimed in claim 1, comprising the step of using an electronically scanned map including map elements not stored in digital form, and positioning said scanned map by selecting at least three discrete and spaced waypoints with known co-ordinate data and electronically bringing these waypoints in coverage with the data of the same waypoints on the stored electronic map, and using the scanned map as a layer that can be displayed on said screen.

4. The method as claimed in claim 1, further comprising the step of drawing at least a required route segment on the touch screen when displaying a selected map, and navigating said user along the drawn route.

5. The method as claimed in claim 4, wherein drawing a plurality of route segments, and in case the end point of a drawn segment is within a predetermined minimum distance from the beginning of a subsequent drawn route segment, uniting said segments to form a required route.

6. The method as claimed in claim 1, comprising the step of using a compass menu enabling the selection of predetermined compass information on a displayed map, said compass information is selected from the group of showing at least one of the four main directions on the actually displayed map, showing the momentary position of the sun on the momentary displayed map for better orientation of the user in the field.

7. A GPS-based navigation method using a mobile navigation device having a touch screen display, comprising the steps of:
 (a) determining the actual position coordinate data of said device by a GPS receiver unit;
 (b) storing said data in a memory;
 (c) storing digital map information of an area including the actual position of said device, said digital information comprises at least latitude and longitude and preferably altitude map data of said area;
 (d) displaying a function menu on said display comprising a plurality of function fields, each field is associated with a main function for selecting a sub menu associated with said function, wherein said fields including at least:
  (i) a map field for selecting a map sub menu,
  (ii) a trip manager field for selecting a trip manager sub menu,
  (iii) a trip computer field for selecting the display of predetermined trip data,
  (iv) a setting field for selecting different setting functions;
 (e) arranging a predetermined number of function key fields away from a central area of said touch screen to enable easy selection of frequently used adjustment tools or functions; and
 (f) navigating the user in line with his/her selected and adjusted options, wherein said map sub menu enables the selection of the display of at least three different type of maps differing from each other in scale, source of origin and information content; said trip manager sub menu enables the selection of waypoint management, a route management including a find and a target setting function, and a route storage and/or retrieval function; said trip computer sub menu allowing display of predetermined route- and position-related information and data, further comprising the step of drawing at least a required route segment on the touch screen when displaying a selected map, and navigating said user along the drawn route.

8. The method as claimed in claim 7, wherein drawing a plurality of route segments on a displayed map, and in case the end point of a drawn segment is within a predetermined minimum distance from the beginning of a subsequent drawn route segment, uniting said segments to form a required route.

9. The method as claimed in claim 7, comprising the step of using a compass menu enabling the selection of predetermined compass information on a displayed map, said compass information is selected from the group of showing at least one of the four main directions on the actually displayed map, showing the momentary position of the sun on the momentary displayed map for better orientation of the user in the field.

* * * * *